(12) United States Patent
Yamamoto

(10) Patent No.: US 7,589,907 B2
(45) Date of Patent: Sep. 15, 2009

(54) ZOOM LENS SYSTEM, IMAGE PICKUP DEVICE AND DIGITAL DEVICE

(75) Inventor: Yasushi Yamamoto, Kishiwada (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/140,529

(22) Filed: Jun. 17, 2008

(65) Prior Publication Data
US 2008/0316617 A1   Dec. 25, 2008

(30) Foreign Application Priority Data
Jun. 21, 2007   (JP) ............................. 2007-163421

(51) Int. Cl.
*G02B 15/14* (2006.01)
(52) U.S. Cl. .................... 359/682; 359/686; 359/689; 359/715; 359/716; 359/740
(58) Field of Classification Search ................. 359/680, 359/682–686, 689, 715, 716, 740, 761, 770, 359/781, 784
See application file for complete search history.

(56) References Cited

U.S. PATENT DOCUMENTS

| | | | |
|---|---|---|---|
| 6,721,106 B2 | 4/2004 | Yamamoto et al. | 359/689 |
| 7,085,072 B2 | 8/2006 | Kuba | 359/689 |
| 7,394,599 B2 * | 7/2008 | Kawakami et al. | 359/680 |
| 2007/0024984 A1 | 2/2007 | Iwasawa | 359/680 |
| 2007/0242366 A1 * | 10/2007 | Saito | 359/680 |

* cited by examiner

*Primary Examiner*—Evelyn A. Lester
(74) *Attorney, Agent, or Firm*—Sidley Austin LLP

(57) ABSTRACT

A zoom lens system includes, in order from an object side: a first lens group having a negative optical power, a second lens group having a negative optical power, and, a third lens group having a positive optical power. The position of the first lens group is fixed during zooming, and the third lens group includes three single lenses including, in order from the object side, a third-first lens being a single lens having a positive optical power, a third-second lens being a single lens having a negative optical power and a third-third lens being a single lens having a positive optical power. The zoom lens system satisfies the following conditional expression: $0.35 < L3/f3 < 1.5$ where $L3$ represents the axial air gap distance between the third-second lens and the third-third lens and $f3$ represents the focal length of the third lens group.

20 Claims, 15 Drawing Sheets

EXAMPLE 4

EXAMPLE 3

FIG. 4
EXAMPLE 4
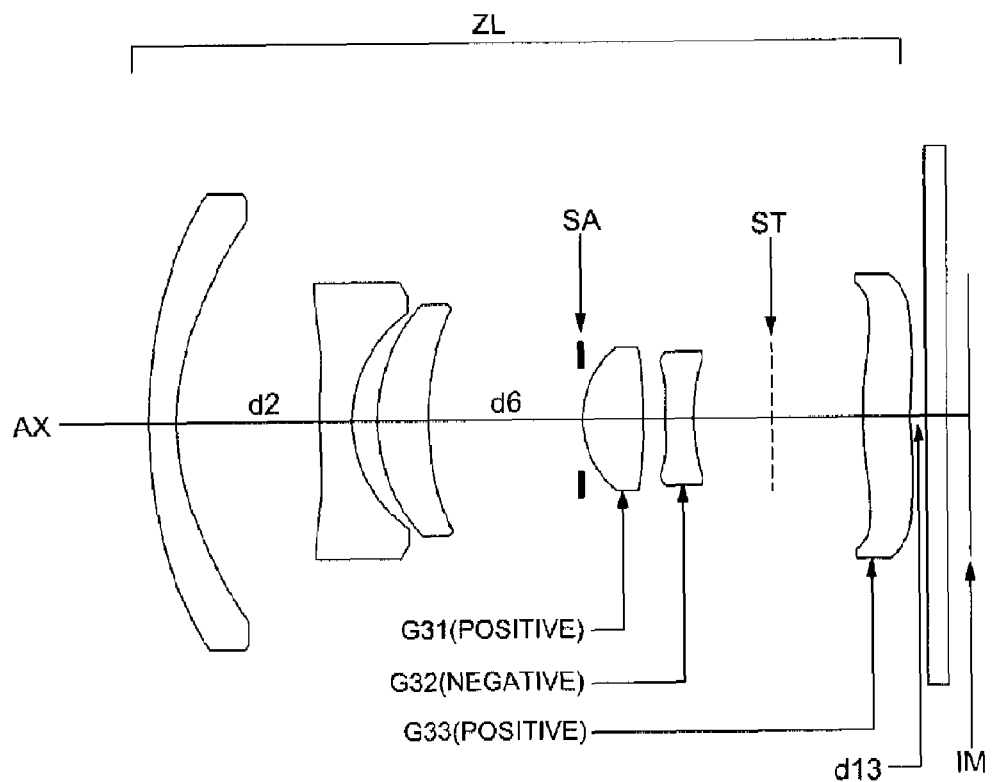
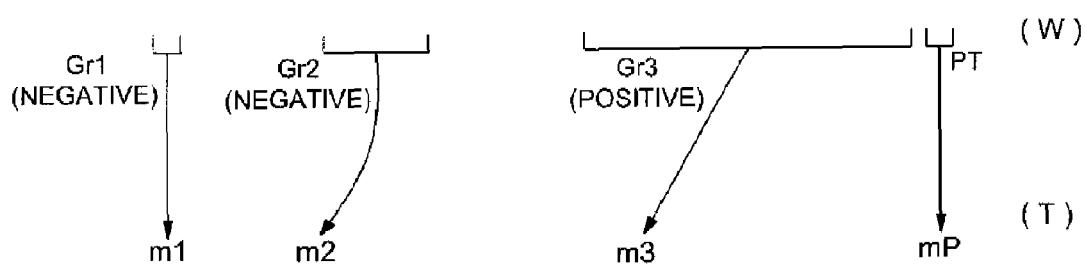

EXAMPLE 5

FIG. 6
EXAMPLE 6
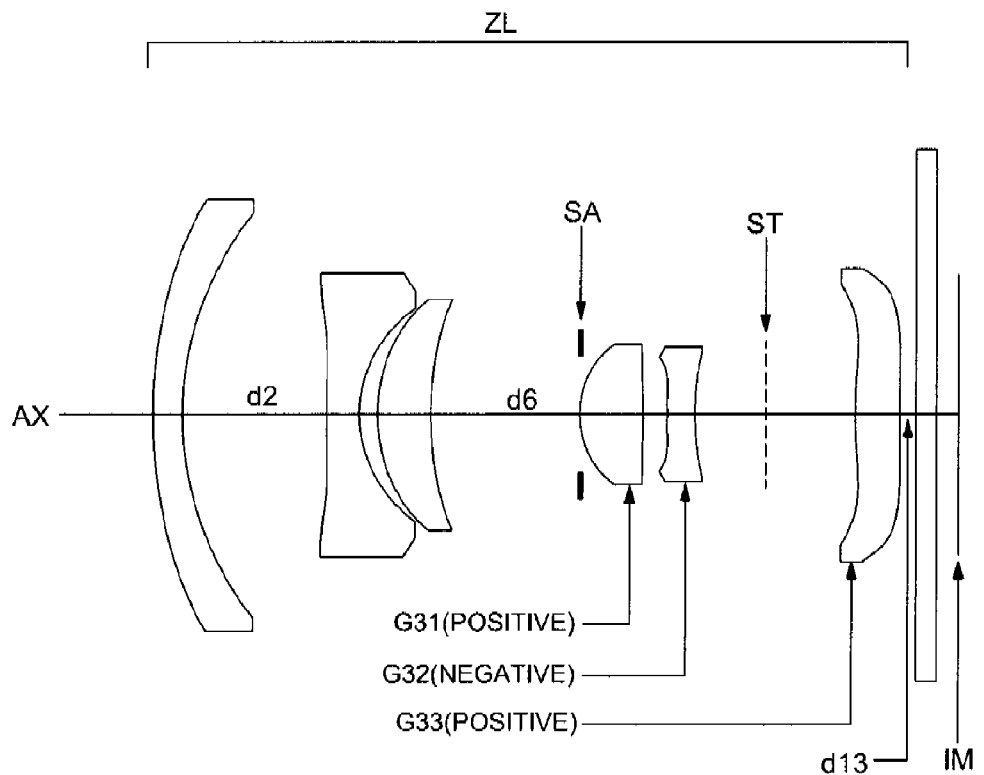
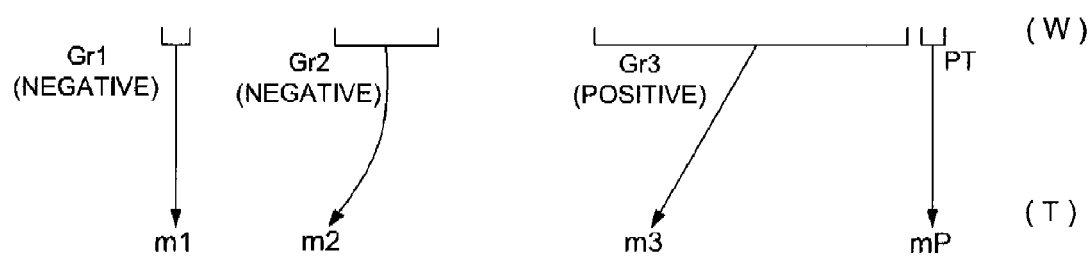

EXAMPLE 2

EXAMPLE 4

EXAMPLE 5

EXAMPLE 6

ZOOM LENS SYSTEM, IMAGE PICKUP DEVICE AND DIGITAL DEVICE

This application is based on Japanese Patent Application No. 2007-163421 filed on Jun. 21, 2007 in Japanese Patent Office, the entire content of which is hereby incorporated by reference.

BACKGROUND OF THE INVENTION

The present invention relates to a zoom lens system and an image pickup device, for example, a zoom lens system used for an optical unit for taking in an image of a photographic object with an image pickup sensor and an image pickup device (especially, an image pickup device which is a main structural element of a camera which is installed inside or outside of a digital camera, a personal computer, a mobile computer, a mobile phone, an information mobile terminal, etc.) equipped with it.

In recent years, a digital camera spreads quickly, and is used not only as a means taking an image into a computer, but also used widely as a means for leaving behind photographs as same as a conventional silver halide film camera. Further, the miniaturization of a camera unit also has progressed with the miniaturization of an image pickup sensor, and a micro camera unit has mounted commonly on a mobile phone. In addition to an object to leave behind photographs, adaptation for a trend to increase the number of pixels and an enlargement of a zooming region has been requested strongly as the specification of an image pickup optical system.

As one of the means for satisfying these requests, U.S. Pat. No. 6,721,106B2, U.S. Pat. No. 7,085,072B2, and US2007/0024984A1 has proposed a zoom lens which is designed to be miniaturized with the structure that a first lens group having a positive power, a second lens group having a negative power, and a third lens group having a positive power are arranged in this order from the object side.

The zoom lens proposed in U.S. Pat. No. 6,721,106B2 and US2007/0024984A1 includes a relatively wide view angle in the first lens group in a changeable magnification region and has a changeable magnification ratio of about three times. Further, the zoom lens proposed in U.S. Pat. No. 7,085,072B2 attains a changeable magnification ratio of about two times with a relatively small number lenses. However, there is a problem that a size of the optical system is relatively large.

The present invention has been conceived in view of the above circumstances, and its object is to provide a zoom lens system which achieves the miniaturization and has a changeable magnification ratio of about three times.

SUMMARY OF THE INVENTION

In order to attain the above-mentioned object, the zoom lens system according to the invention is a zoom lens system which includes a first lens group having a negative optical power, a second lens group having a negative optical power, and a third lens group having a positive optical power, sequentially from an object side, the zoom lens system is characterized in that the position of the above-mentioned first lens group is fixed during zooming, the third lens group consists of three lenses of a single lens having a positive optical power, a single lens having a negative optical power, a single lens having a positive optical power sequentially from the object side, and when the three single lenses constituting the above third lens group are represented with a third-first lens, a third-second lens, and a third-third lens at order from the object side, the following conditional expression (1) is satisfied, $$0.35 < L3/f3 < 1.5 \tag{1}$$

where L3 represents an air space distance between the third-second lens and the third-third lens, and f3 represents a focal length of the third lens group.

BRIEF DESCRIPTION OF THE DRAWINGS

FIG. 4 is a lens constitutional diagram of the fourth embodiment (Example 4);

FIG. 6 is a lens constitutional diagram of the sixth embodiment (Example 6);

DETAILED DESCRIPTION OF THE PREFERRED EMBODIMENT

Figure 1:
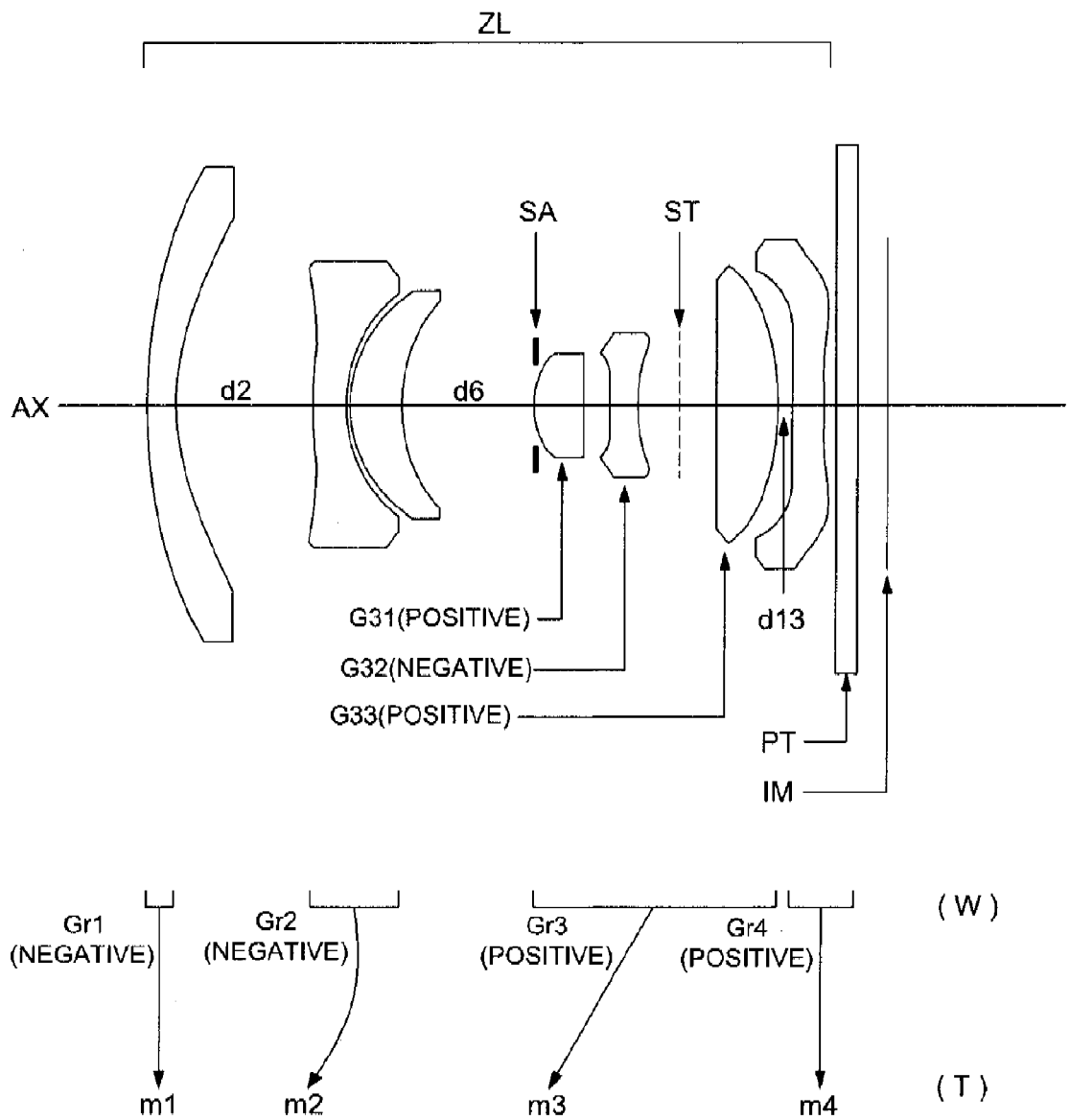
FIG. 1 is a lens constitutional diagram of the first embodiment (Example 1)

Hereinafter, preferable embodiments of the present invention are explained, however, the present invention is not limited to these embodiments.

First, a zoom lens system, an image pickup device, and the like according to the present invention are explained with reference to drawings.

The zoom lens system according to the invention is a zoom lens system which includes a first lens group having a negative optical power, a second lens group having a negative optical power, and a third lens group having a positive optical power sequentially from an object side, wherein the position of the above-mentioned first lens group is fixed during zooming, and the third lens group consists of three lenses of a single lens having a positive optical power, a single lens having a negative optical power, a single lens having a positive optical power sequentially from the object side.

Further, when the three single lenses constituting the above third lens group are represented with a third-first lens, a third-second lens, and a third-third lens at order from the object side, it is characterized in that the following conditional expression is satisfied, $$0.35 < L3/f3 < 1.5 \tag{1}$$

where L3 represents an air space distance between the third-second lens and the third-third lens, and f3 represents a focal length of the third lens group.

In order that a lens overall length is not changed at the time of changing magnification, the position of the first lens group is fixed during zooming as mentioned above. The second lens group has a role of compensator and the third lens group mainly achieves changeable magnification. The third lens group consists of three lenses of positive one, negative one and negative one sequentially from the object side, and since the zoom lens system is made to satisfy the conditional expression (1), an air space distance between the third-second lens and the third-third lens is set as a suitable size.

Usually, when the miniaturization of an optical overall length is attempted, the fluctuation of the position of an exit pupil to an image pickup sensor becomes large. Therefore, a technique to suppress the fluctuation becomes a theme in the case of attaining a high performance of a zoom lens system. Because, on the characteristic of image pickup sensors, such as CCD (Charge Coupled Device) and a CMOS (Complementary Metal Oxide Semiconductor) sensor, it is essential as a requirement for an optical system to be telecentric for light rays emitted to the image pickup sensors. In recent years, with the miniaturization of image pickup sensors, in order to converge light rays entering the image pickup sensors, it becomes popular to increase efficiency with a structure to install a micro lens for each light receiving element on the object side surface of the image pickup sensors. Further, in the optical system of a single focus lens used for a mobile phone, with the miniaturization of the overall length of an optical system, since it becomes difficult to secure the telecentricity of exiting light rays, it has been conventionally conducted to devise an arrangement of a micro lens so as to bring the position of an exit pupil close more to the image pickup sensor side. However, even when the position of an exit pupil is adjusted in such a way, it is required as a essential requirement for an optical system that there is little fluctuation of the position of an exit pupil to an image pickup sensor. The reason is that if the fluctuation of the position of an exit pupil becomes large, image missing may occur in a micro lens, thereby causing an adverse effect on final image quality.

In the zoom lens system according to the present invention, sequentially from the object side, the third lens group Gr3 consists of three single lenses of the third-first lens with a positive power, the third-second lens with a negative power and the third-third lens with a positive power and the distance between the third-second lens and the third-third lens is made relatively longer so as to utilize the difference in the height of light rays passing through the third-third lens between a wide angle end position and a telephoto position, thereby suppressing the fluctuation of the position of an exit pupil in the third lens group. Concretely, the distance between the third-second lens and the third-third lens is set appropriately such that on the wide angle end position, an abaxial light flux (off-axis light flux) proceeds along a position where the effective diameter of the third-third lens is high, and on the telephoto position, an abaxial light flux proceeds along a position where the effective diameter of the third-third lens is low, (refer an optical path diagram described later (FIG. 14 and FIG. 15)). Moreover, when a suitable positive power is provided for the third-third lens so as to utilize the difference of the positive power by the effective diameter of the third-third lens, it becomes possible to correct the position of an exit pupil toward the body side more strongly on the wide angle end position, whereby it becomes possible to reduce the fluctuation of the position of an exit pupil between the wide angle end position and a telephoto end position.

If the value of (L3/f3) exceeds the upper limit of the conditional expression (1), with the long air space distance L3, the entire body of the third lens becomes too long. As a result, since the overall length of an optical system becomes long, it is not desirable for attaining the miniaturization of an optical system.

On the contrary, if the value of (L3/f3) is less than the lower limit of the conditional expression (1), it is not desirable, because the effect to correct the position of an exit pupil in the third-third lens becomes weak.

It is desirable that the third lens group satisfies the following conditional expression (2), $$0.5 < f3/fw < 1.5 \quad (2)$$

where f3 represents the focal length of the third lens group.

The conditional expression (2) specifies a desirable condition range for setting up appropriately the power ratio of the third lens group to the entire system of the zoom lens system and making the zoom lens system a small size. Further, when the zoom lens system satisfies the conditional expression (2), the effect according to the conditional expression (1) becomes remarkable. The lower limit of this conditional formula is a preferred value to correct spherical aberration generated in the third lens group by suppressing the power of the third lens group. On the other hand, the upper limit of this conditional formula is a preferred value to make the moving distance of the third lens group proper and to make the small size.

Moreover, it is more desirable to satisfy the following conditional expression (2a):

$$0.7 < f3/fw < 1.3 \quad (2a)$$

With the structure to satisfy the conditional expression (2a), the above effect is exhibited appreciably.

With regard to the power of the third-third lens, it is desirable to satisfy the following conditional expression (3), $$3 < f33/f3 < 15 \quad (3)$$

where f33 represents the focal length of the third-third lens, and f3 represents the focal length of the third lens group.

The conditional expression (3) specifies a desirable condition range for setting up appropriately the power of the third-third lens having a positive optical power.

If the value of (f33/f3) exceeds the upper limit of the conditional expression (3), since the power of the third-third lens becomes weak too much, it is not desirable, because the effect to correct the position of an exit pupil become weak.

On the contrary, if the value of (f33/f3) is less than the lower limit of the conditional expression (3), since the power of the third-third lens becomes strong too much, the correction of astigmatic generated in the third-third lens becomes difficult.

Further, the third-third lens can be constituted with a resin lens. Since the third-third lens is comparatively close to an image surface, an axial light height is low. Therefore, if the third-third lens is made of a resin material, problems occurring in the case of using the resin material, such as the fluctuation of an image forming position due to temperature change and the deterioration of performance due to a surface precision error, occur hardly. Therefore, it is desirable to constitute the third-third lens with a resin material in terms of cost and a weight.

It is desirable that the third-third lens has at least one aspheric surface. By employing at least one aspheric surface for the third-third lens, it becomes possible to conduct correcting astigmatic amendment well. Further, it is desirable from the point of correcting the position of an exit pupil to constitute the image side surface of the third-third lens with an aspheric surface to make the power stronger as the height on the optical axis becomes higher.

With regard to the aspheric surface constituting the image side surface of the third-third lens, it is desirable to satisfy the following conditional expression (4), $$-80 < f33/Dev33r < -20 \qquad (4)$$

where f33 represents the focal length of the third-third lens, and Dev33r represents the difference in height in the optical axis direction at the maximum effective radius between a reference spherical shape $X_o$ and a spherical shape $X$ (Dev33r=$X-X_o$).

The conditional expression (4) specifies a desirable condition range for setting up appropriately the shape of the aspheric surface constituting the image side surface of the third-third lens.

If the value of (f33/Dev33r) exceeds the upper limit of the conditional expression (4), since the effect of the aspheric surface becomes weak, the correction of the position of an exit pupil becomes insufficient.

On the contrary, if the value of (f33/Dev33r) is less than the lower limit of the conditional expression (4), since the effect of the aspheric surface becomes too strong, the correction of the spherical aberration generated on the surface becomes difficult.

In a camera unit employing image pickup sensors, such as CCD and CMOS sensors, a light amount adjusting device, such as a shutter and an ND filter, is used. The light amount adjusting device is used for an exposure adjustment at the time of high luminance and is used even at locations other than what is called an optical regulating plane. For example, in the zoom lens described in US2007/0024984A1, a first lens group having a negative power, a second lens group having a negative power, a third lens group having a positive power, a light amount adjusting device, and a fourth lens group having a positive power are arranged in this order from the object side, and it is structured that a light amount adjustment is conducted at a position other than an optical regulating plane. In the structure of US2007/0024984A1, a light amount adjusting device is arranged behind a third lens group being a main magnification changing group. Therefore, in order to avoid interference with the fourth lens group, it is necessary to fully secure a space between the third lens group and the fourth lens group. As a result, since the travel distance of the third lens group is restricted, it becomes disadvantageous in terms of the miniaturization of an optical system.

From the above-mentioned viewpoint, it is desirable to have a light amount adjusting device in the third lens group. If the light amount adjusting device is arranged in the third lens group, the interference with other zoom groups can be avoided and the travel distance of the third lens group can fully be secured. Since the travel distance is securable, the enlargement of the power of the third lens group can be reduced. Therefore, it becomes possible to attain the miniaturization of an optical system while securing the good aberration performance.

It is more desirable to have a light amount adjusting device between the third-second lens and the third-third lens. The light amount adjusting device is constituted with plural plate members, such as a shutter plate for light shielding and an ND filter for light amount attenuation though it may change depending on the specifications required of the camera unit. Therefore, the light amount adjusting device needs the thickness in the direction of an optical axis. Since a sufficient space distance for constituting a light amount adjusting device is secured between the third-second lens and the third-third lens, it is desirable to arrange a light amount dusting device in the space distance, because it does not provide any influence to other zoom space distance.

It is desirable that the third-second lens has at least one aspheric surface. Since the third-first lens bears the large portion of the positive power of the third lens group, strong spherical aberration is generated. With the structure to provide an aspheric surface onto at least one surface of the third-second lens, the aspheric aberration generated in the third-first lens can be corrected efficiently.

With regard to the surface shape of the third-second lens, it is desirable to satisfy the following conditional expression (5), $$0.2 < (CR1-CR2)/(CR1+CR2) < 1.8 \qquad (5)$$

where CR1 represents the radius of curvature at the object side of the third-second lens, and CR2 represents the radius of curvature at the image side of the third-second lens.

The conditional expression (5) specifies a desirable condition range for setting up appropriately the curvature of surfaces at the object side and the image side of the third-second lens.

If the value of ((CR1−CR2)/(CR1+CR2)) exceeds the upper limit of the conditional expression (5), since the radius of curvature of the image side surface of the third-second lens becomes too large and the position of a principal-point moves close to the object side too much, a light flux in the third lens group becomes large. As a result, since a diameter to regulate a light flux becomes large, it is not desirable.

On the contrary, if the value of ((CR1−CR2)/(CR1+CR2)) is less than the lower limit of the conditional expression (5), since the radius of curvature of the image side surface of the third-second lens becomes small too much, the astigmatism generated in the surface of the image side becomes large. As a result, the correction of the astigmatism becomes difficult.

With regard to the negative power of the first lens group, it is desirable to satisfy the following conditional expression (6), $$-3.7 < f1/fw < -2 \qquad (6)$$

where f1 represents the focal length of the first lens group, and fw represents the focal length of the whole system at the wide angle end position.

The conditional expression (6) specifies a desirable condition range for setting up the power of the first lens group appropriately.

If the value of (f11/fw) exceeds the upper limit of the conditional expression (6), the power of the first lens group becomes strong too much, and it becomes difficult to correct a negative distortion generated in the first lens group.

On the contrary, if the value of (f11/fw) is less than the lower limit of the conditional expression (6), since the power of the first lens group becomes weak too much, the effective diameter of the first lens group increases. Therefore, it is not desirable in terms of the miniaturization of an optical system.

It is desirable that the first lens group has at least one aspheric surface. With the structure to provide an aspheric surface on at least one surface of the first lens group, it is possible to correct a negative distortion aberration generated in a first lens group well. Further, it is desirable that the first lens group consists of one lens. With the structure to consist the first lens group with one lens, it contributes the miniaturization of the overall length and it is desirable for attaining low cost.

Moreover, with regard to the power balance of the first lens group and the second lens group, it is desirable to satisfy the following conditional expression (7), $$0.5 < f1/f2 < 1.5 \tag{7}$$

where f1 represents the focal length of the first lens group, and f2 represents the focal length of the second lens group.

The conditional expression (7) specifies a desirable condition range for setting up appropriately a power ratio of the first lens group and the second lens group.

If the value of (f1/f2) is less than the lower limit of the conditional expression (7), since the power of the first lens group becomes strong too much, it becomes difficult to correct a negative distortion generated in the first lens group.

On the contrary, if the value of (f1/f2) exceeds the upper limit of the conditional expression (7), since the power of the first lens group becomes weak too much, the effective diameter of the first lens group increases. Therefore, it is not desirable in respect of the miniaturization of an optical system.

When a zoom lens system having a changeable magnification of about three times retains the characteristics specified in the present invention while attaining the miniaturization, in the case where, for example, image circle is about 6 mm in diagonal length, it is possible to provide the zoom lens system with a high optical performance over the entire zooming region that a spherical aberration and an image plane curvature are within about 100 μm and a distortion aberration is a maximum of about 5% and to realize a size with an maximum overall length of 20 mm or less. Therefore, according to the present invention, it is possible to realize a small size and high performance zoom lens system having a changeable magnification of about three times and an image pickup device equipped with it. Further, by the application of the image pickup device according to the present invention to a digital device such as a digital camera, it is possible to attribute to make the digital device thin, light, compact, with low cost, high performance, and high function.

The zoom lens system according to the present invention is suitable for the usage as an image pickup optical system for digital equipments with an image input function (for example, a digital camera, a video camera, etc.). Therefore, when the zoom lens system is combined with an image pickup sensor, it can constitute an image pickup device to take in an image of a photographic object and to output the image as electric signals. The image pickup device is an optical device constituting a main structural element of a camera used for a still image photography and moving image photography of a photographic object, and is structured with, in the order from the substance (namely, photographic object), an image pickup optical system to form an optical image of a substance and an image pickup sensor to convert the optical image formed by the image pickup optical system into electric signals.

Examples of the camera include a digital camera, a video camera, a surveillance camera, an in-vehicle camera, a camera for videophones, and so on, further include camera installed in or outside of a personal computer, mobile information devices (for example, small and portable information equipment terminal devices such as a mobile computer, a mobile phone, and a mobile information terminal device), peripheral devices (a scanner, a printer, etc.) of these, and other digital devices. As can be seen from these examples, by use of image pickup devices, it is possible to structure a camera. In addition, by installation of image pickup devices into various kinds of devices, it is also possible to add a camera function. For example, it is possible to structure a digital device with an image inputting function such as a camera-fitted mobile phone.

Figure 13:
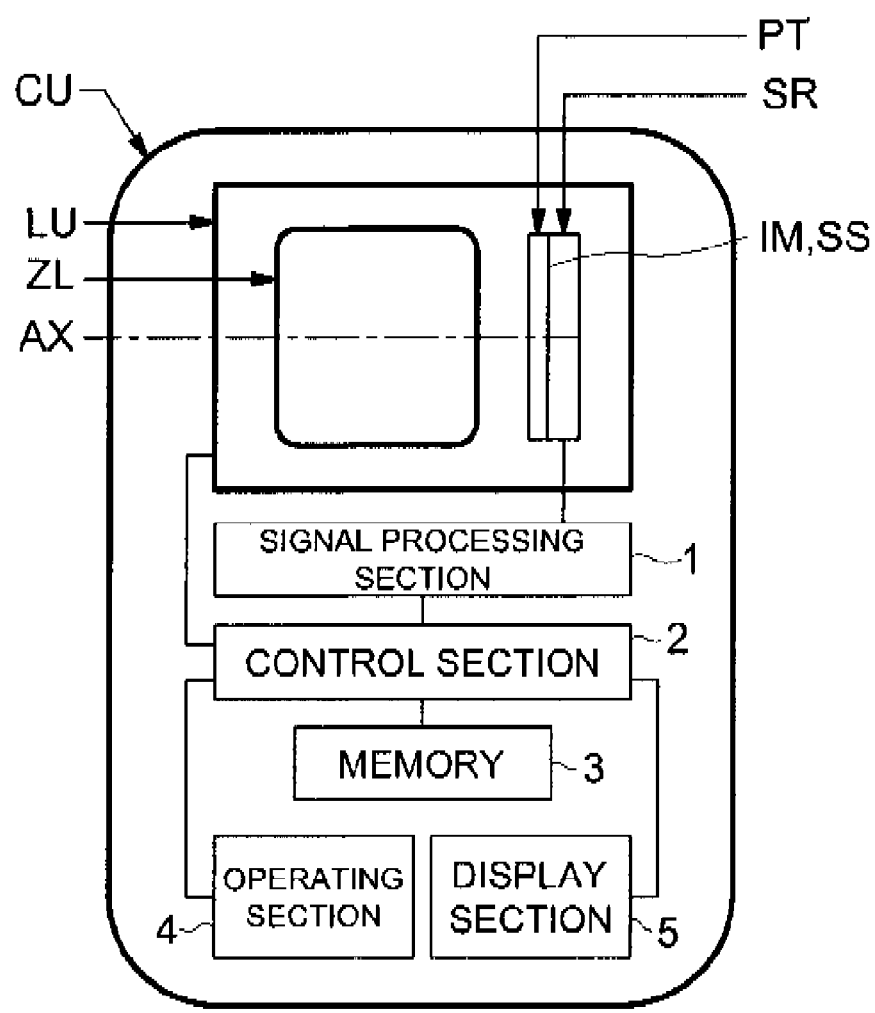
FIG. 13 is a schematic drawing showing an outlined constitutional example of a digital device equipped with an image pickup device.

FIG. 13 shows a schematic cross section of an example of an outline structure of a digital device CU (it is equivalent to a digital device with an image input function, such as a digital camera.). An image pickup device LU installed in the digital device CU shown in FIG. 13 is provided with, sequentially from an object (namely, photographic object) side, a zoom lens system ZL (it is equivalent to an image pickup optical system.) to form an optical image (image surface) IM of an object with changeable magnification; a parallel plane plate PT (an optical filter arranged if needed, such as an optical low pass filter and an infrared cut filter; it is equivalent to a cover glass of an image pickup sensor SR); and an image pickup sensor SR to convert the optical image IM formed on a light receiving surface SS by the zoom lens system ZL into electric signal. In the case that a digital device CU with an image input function is structured with this image pickup device LU, usually, the image pickup device LU is arranged inside a body of the digital device CU. However, in the case of realizing a camera function, it is possible to adopt a configuration according to need. For example, it is possible to structure the image pickup device LU made in a unit so as to be detachable or rotatable for the body of the digital device CU.

As the image pickup sensor SR, for example, a solid state image pickup device, such as CCD having plural pixels and a CMOS sensor are employed. Since the zoom lens system ZL is arranged such that an optical image IM of a photographic object is formed on the light receiving surface SS of the image pickup sensor SR, the optical image IM formed by the zoom lens system ZL is converted into electric signals by the image pickup sensor SR.

The digital device CU is equipped with a signal processing section 1, a control section 2, a memory 3, an operating section 4, and a display section 5 other than the image pickup device LU. The signals generated by image pickup sensor SR are subjected to a predetermined digital image processing and an image compression processing in the signal processing section 1 if needed, and are recorded as digital video signals in the memory 3 (a semiconductor memory, an optical disk, etc.), or are transmitted to other instruments via a cable or by being converted into infrared signals depending on the case. The control section 2 is structured with a microcomputer and controls intensively a photographing function, an image reproducing function, and a lens movement device for zooming and focusing. For example, the control section 2 controls the image pickup device LU to conduct at least one of a still image photography or dynamic image photography of a photographic object. The display section 5 is a section including a display such as a liquid crystal display monitor and the like and performs an image display by using the image signals converted by the image pickup sensor SR or image information recorded in the memory 3. The operating section 4 is a section including operating members, such as a manual operation button (for example, release button) and an operation dial (for example, photography mode dial), and transmits information inputted by an operator with operational input to the control section 2.

Figure 11:
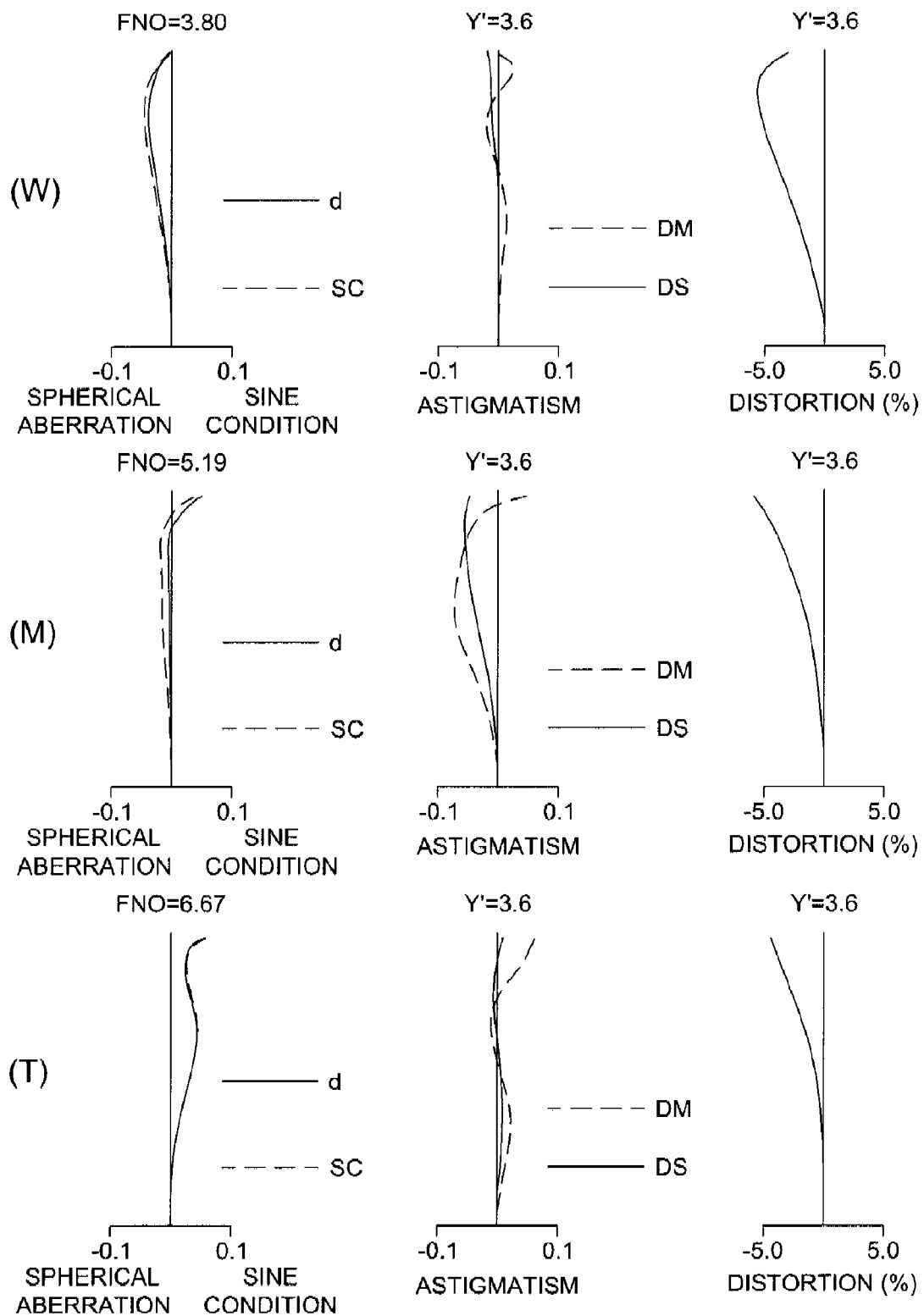
FIG. 11 is an aberration diagram of Example 5.
Figure 12:
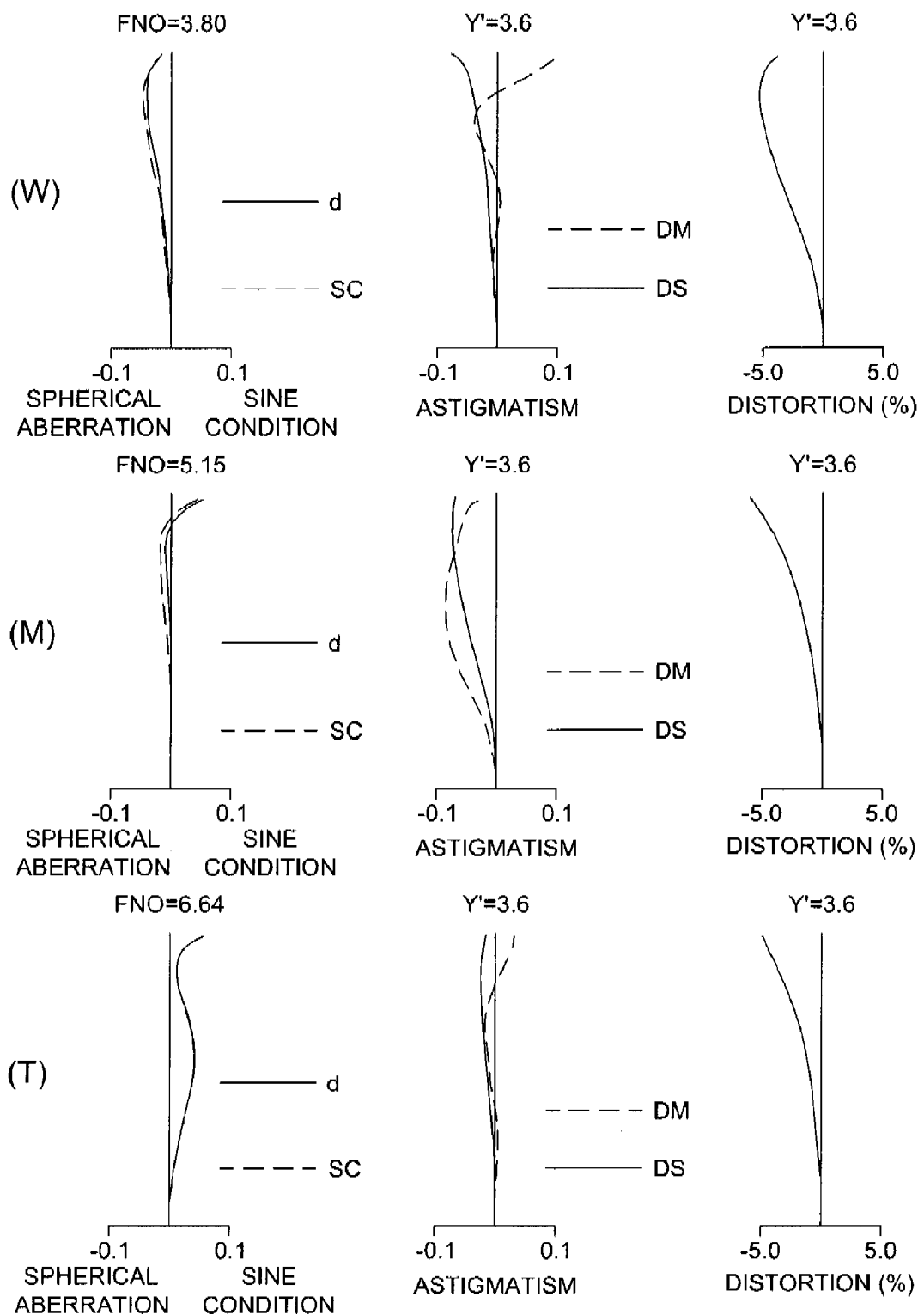
FIG. 12 is an aberration diagram of Example 6.

The zoom lens system ZL has a zoom constitution including four groups of negative group, negative group, positive group, and positive group, as mentioned above, and is structured such that plural lens groups are made to move along a optical axis AX to change gaps among lens groups in order to conduct changeable magnification (namely, zooming). When an optical image to be formed with the zoom lens system ZL passes through an optical low pass filter (it is equivalent to the parallel plane plate PT in FIG. 11.) having a predetermined cut-off frequency characteristic determined on the basis of a picture element pitch of the image pickup sensor SR, the spatial frequency characteristics of the optical image is adjusted such that so-called turn-back noises generated at the time of being converted into electric signals are minimized, whereby the occurrence of color moire can be suppressed. However, if the performance in the vicinity of a resolution limit frequency is refrained, it may be not necessary to worry about the occurrence of noises even if an optical low pass filter is not used. Moreover, when a user performs photography and appreciation by using a display system (for example, a liquid crystal display of a mobile phone, etc.) in which noises are seldom conspicuous, it is not necessary to use an optical low pass filter.

Next, concrete optical structures of the zoom lens system ZL are explained in more detail with reference to the first to sixth embodiments. FIGS. 1 to 6 show the first to sixth embodiments of the zoom lens system ZL with a lens arrangement at a wide angle end (W).

The zoom lens system ZL of the first to third embodiments is a four group zoom lens of negative group, negative group, positive group, and positive group to form an optical image IM of an object with changeable magnification for the image pickup sensor SR, and the zoom lens system ZL of the fourth to sixth embodiments is a three group zoom lens of negative group, negative group, and positive group, to form an optical image IM of an object with changeable magnification for the image pickup sensor SR. In the first to sixth embodiments, the zooming is conducted by changing space distances among lens groups (that is, surface gaps d4, d8 and d16, and in the fifth embodiments, surface distance d2, d6 and d13).

Figure 2:
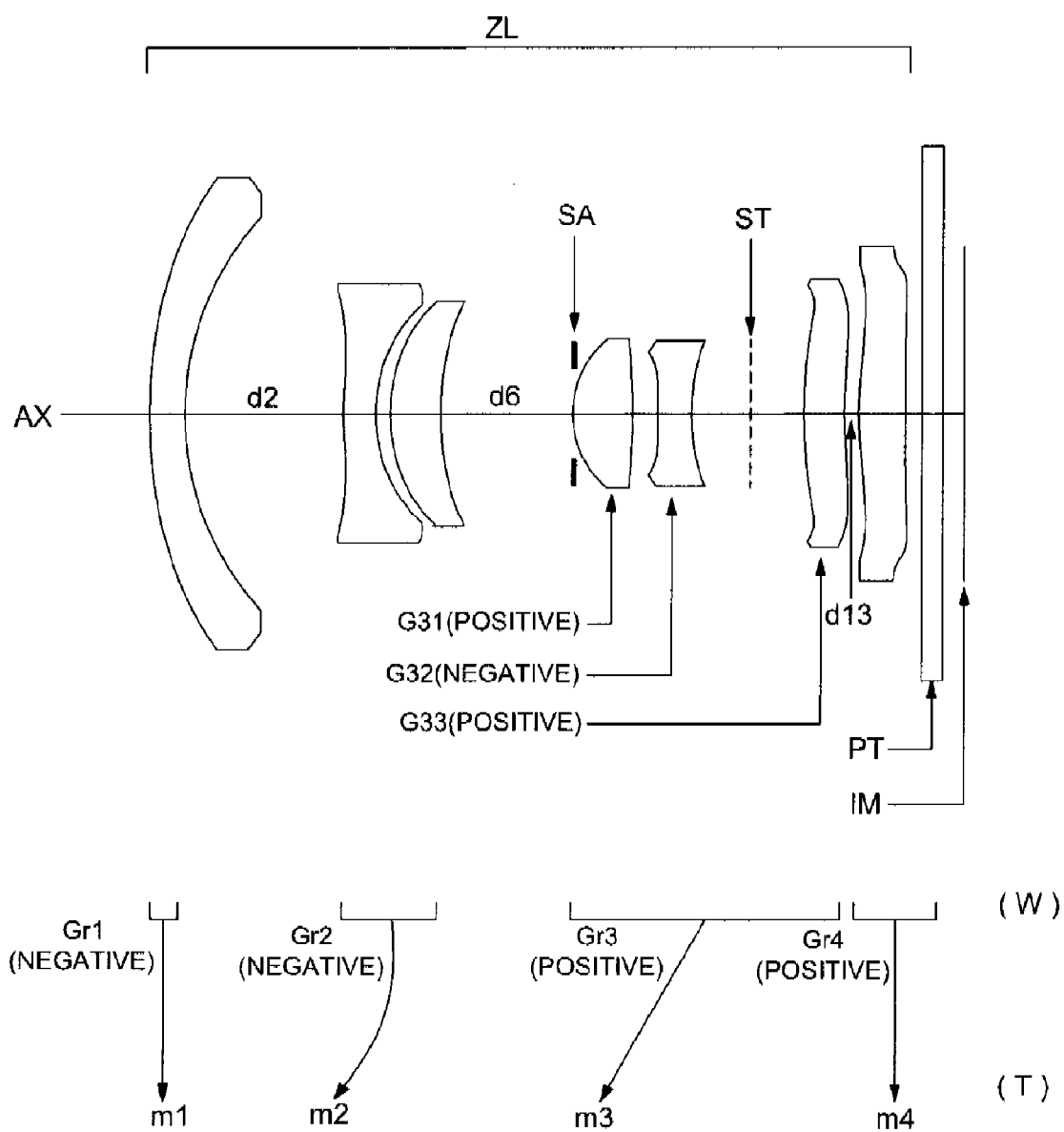
FIG. 2 is a lens constitutional diagram of the second embodiment (Example 2)
Figure 3:
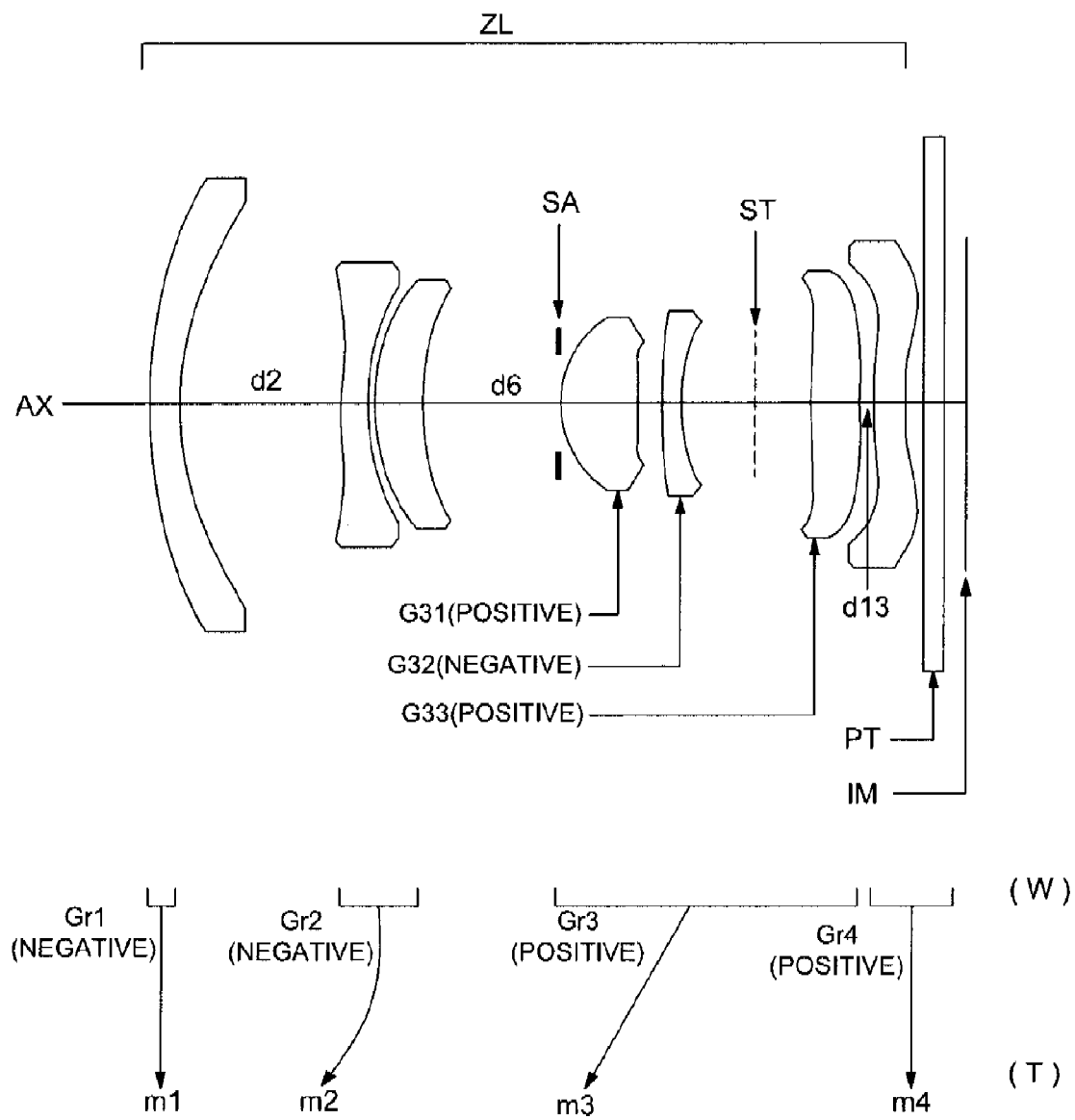
FIG. 3 is a lens constitutional diagram of the third embodiment (Example 3)
Figure 14:
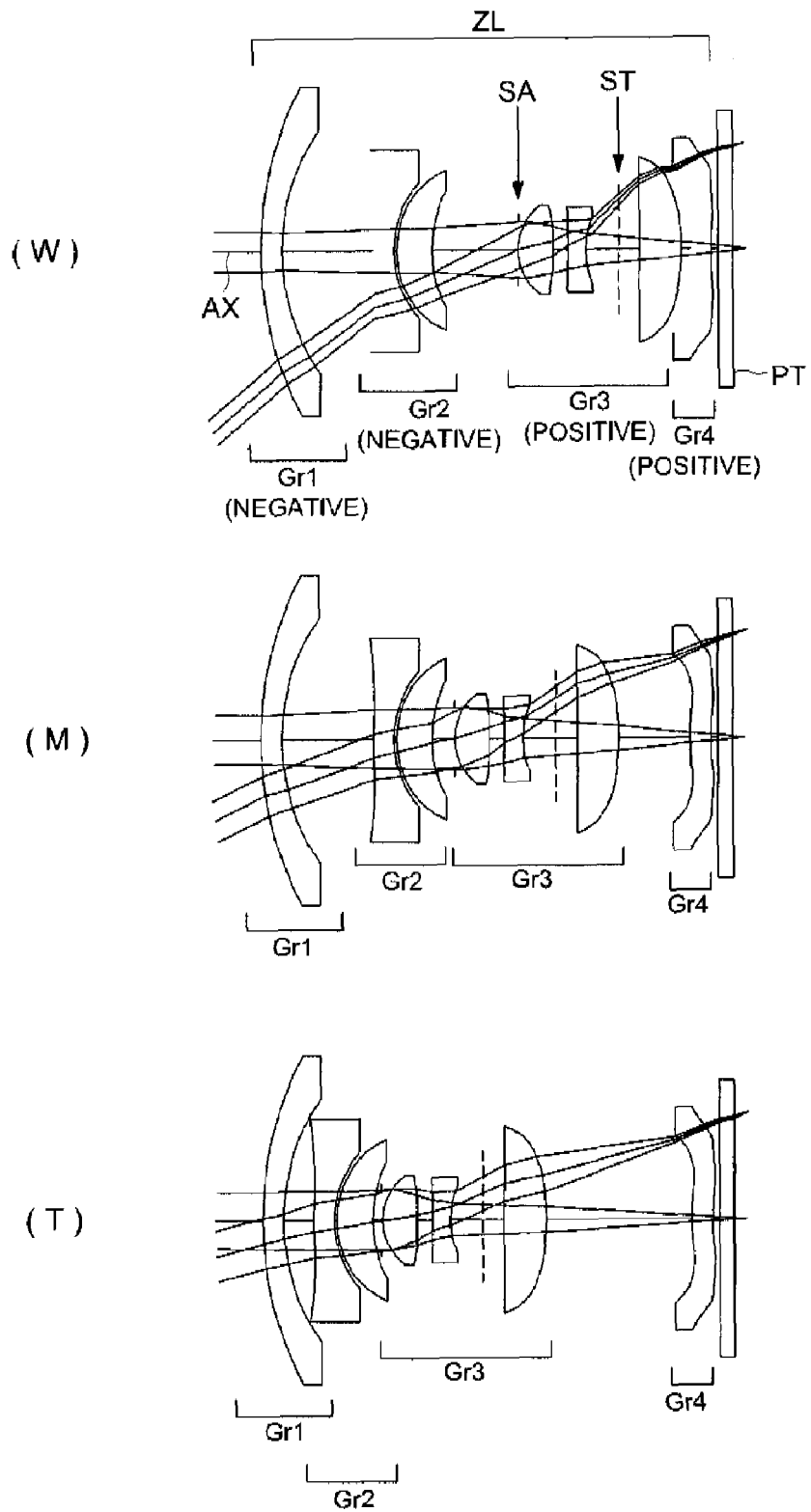
FIG. 14 is an optical path diagram showing an optical arrangement of the first embodiment (Example 1) as one example of a four group lens system of negative group, negative group, positive group and positive group.

In FIGS. 1 to 3, arrow marks m1 to m4 show schematically the locus of zoom movement in the first to third embodiments. The arrow marks m1 to m4 in FIGS. 1 to 3 show the movement (that is, change of a relative position to an image surface IM) of the first lens group Gr1 to the fourth lens group Gr4 during zooming from the wide angle end position (W) to the telephoto end position (T) respectively. However, the arrow marks m1 and m4 show that each position of the first lens group Gr1 and the fourth lens group Gr4 is fixed during the zooming. That is, the first lens group Gr1 and fourth lens group Gr4 are a fixed group, and the second lens group Gr2 and the third lens group Gr3 are a moving group. In FIG. 14, as one example of the four lens group of negative group, negative group, positive group, and positive group, a lens arrangement, an optical path and so on in the first embodiment are shown with three zoom lens positions of a wide angle end position (W), middle position (M) and telephoto end position (T).

Figure 5:
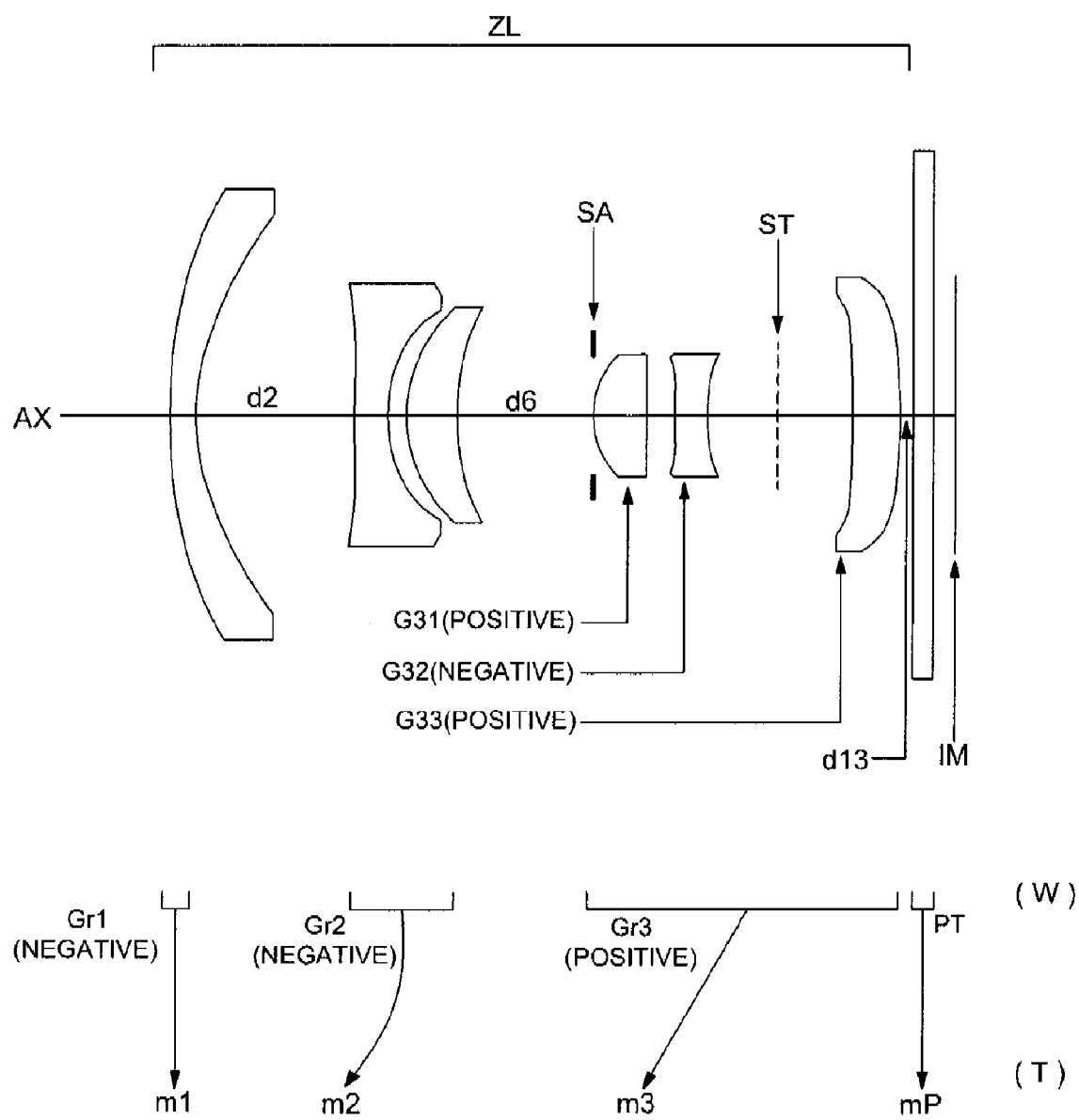
FIG. 5 is a lens constitutional diagram of the fifth embodiment (Example 5)
Figure 7:
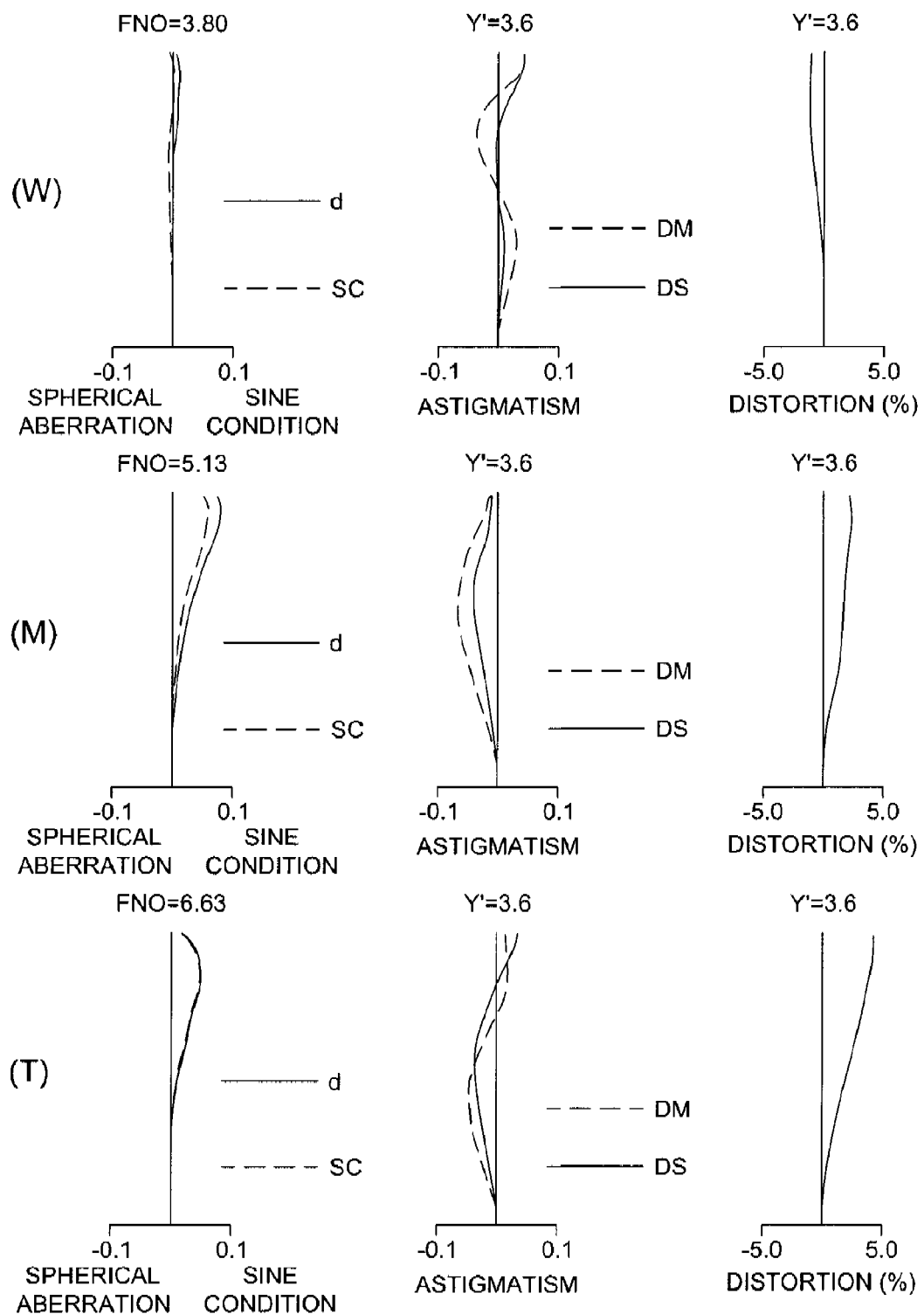
FIG. 7 is an aberration diagram of Example 1.
Figure 8:
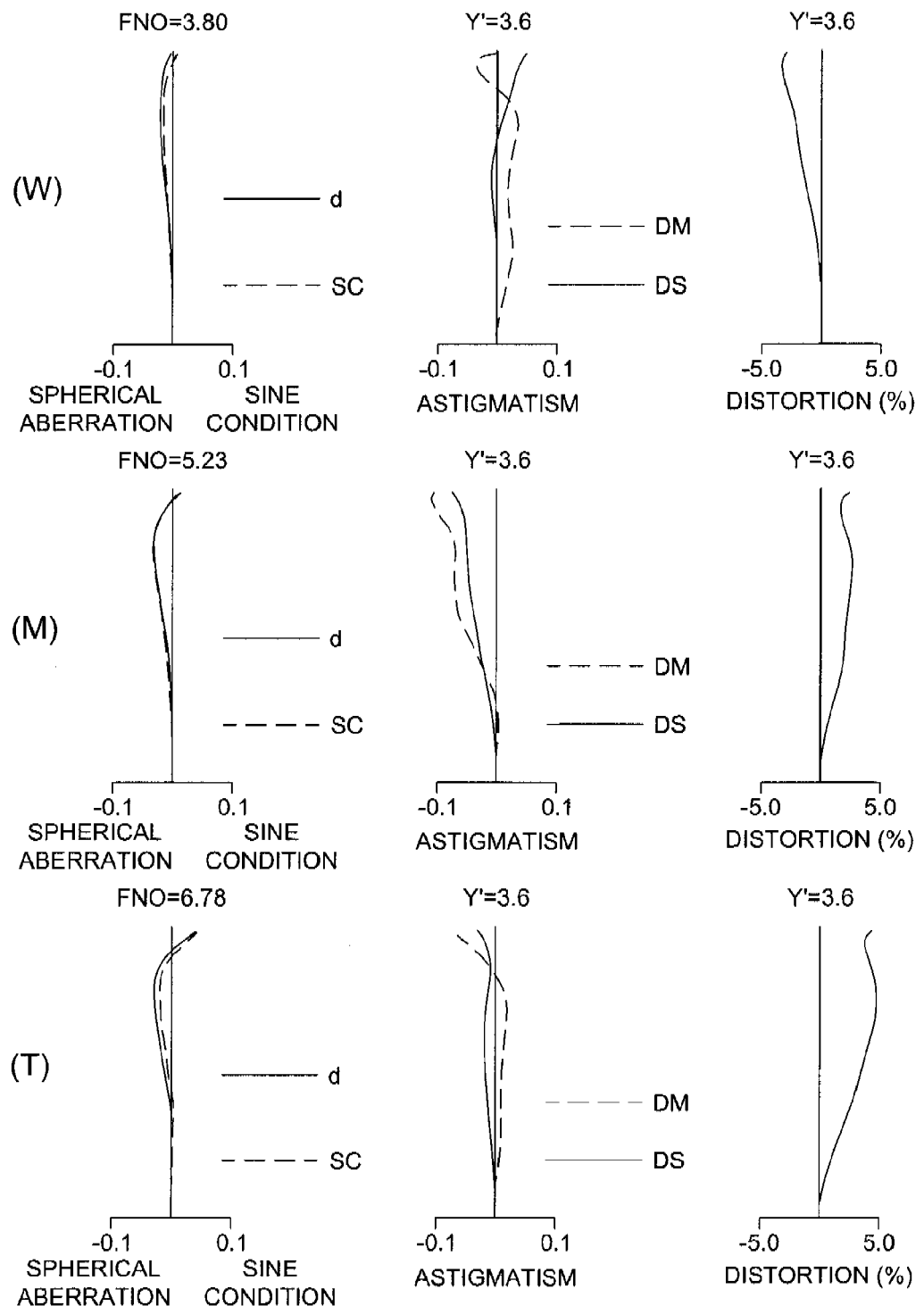
FIG. 8 is an aberration diagram of Example 2.
Figure 9:
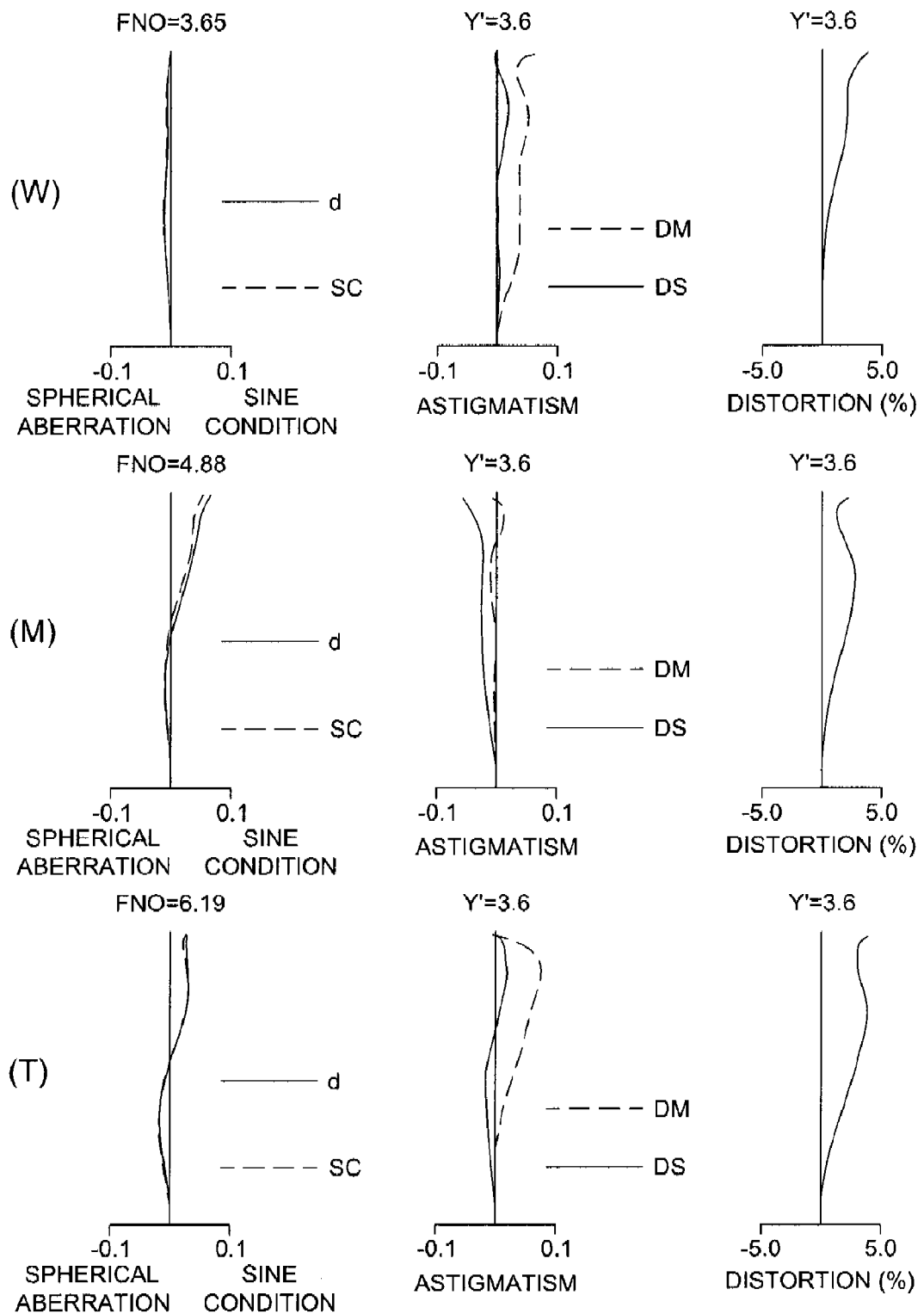
FIG. 9 is an aberration diagram of Example 3.
Figure 10:
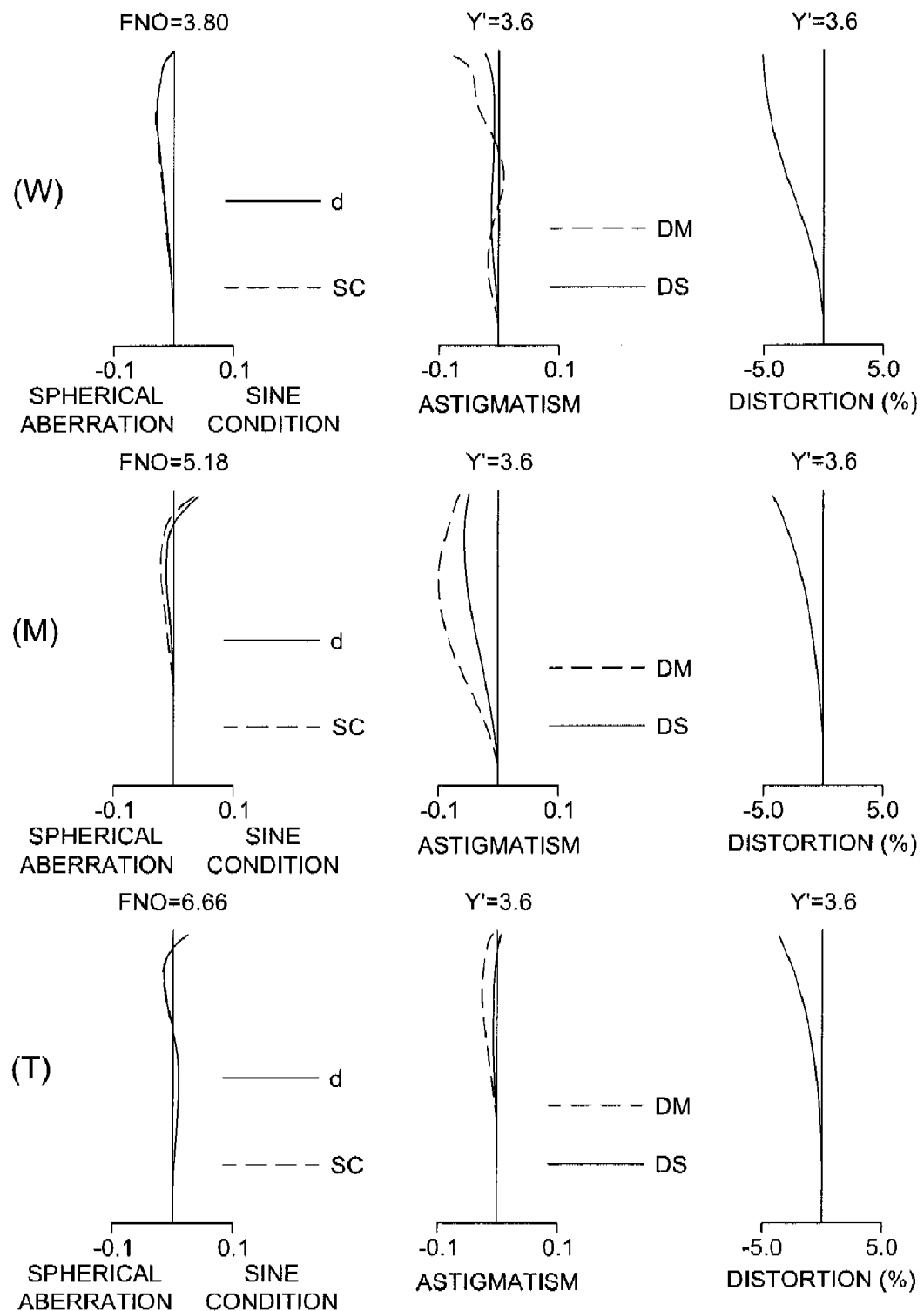
FIG. 10 is an aberration diagram of Example 4.
Figure 15:
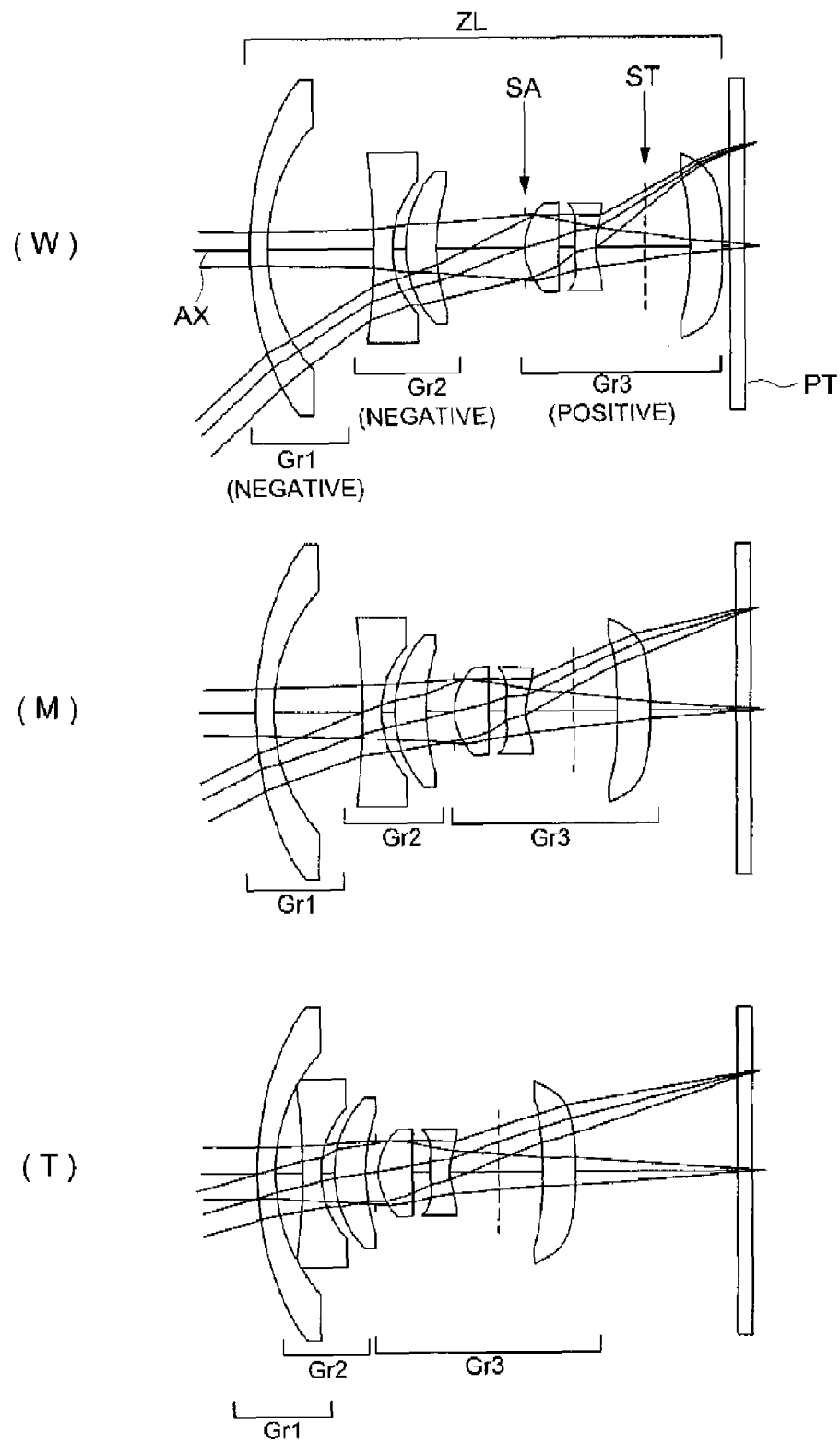
FIG. 15 is an optical path diagram showing an optical arrangement of the fifth embodiment (Example 5) as one example of a three group zoom lens system of negative group, negative group and positive group.

In FIGS. 4 to 6, arrow marks m1 to m3 show schematically the locus of zoom movement in the fourth to sixth embodiments. The arrow marks m1 to m3 in FIGS. 1 to 3 show the movement (that is, change of a relative position to an image surface IM) of the first lens group Gr1 to the third lens group Gr3 during zooming from the wide angle end position (W) to the telephoto end position (T) respectively. However, as same as a parallel plane plate PT whose position is fixed as indicated with the arrow mark mP, the arrow mark m1 shows that the position of the first lens group Gr1 is fixed during the zooming. That is, the first lens group Gr1 is a fixed group, and the second lens group Gr2 and the third lens group Gr3 are a moving group. In FIG. 15, as one example of the three lens group of negative group, negative group, and positive group, a lens arrangement, an optical path and so on in the fifth embodiment are shown with three zoom lens positions of a wide angle end position (W), middle position (M) and telephoto end position (T).

In any embodiments, an aperture diaphragm SA (corresponding to aperture stop) and a light amount adjusting device ST are arranged in the third lens group Gr3. Concretely, the aperture diaphragm SA is arranged so as to adjoin the object side of the third-first lens G31, and the light amount adjusting device ST is arranged between the third-second lens G32 and the third-third lens G33. Since the aperture diaphragm SA and the light amount adjusting device ST are structured to move together with the third lens group Gr3 as one unit during zooming (refer to the arrow mark m3 in FIGS. 1 to 6, and FIG. 12 and FIG. 15), these can be considered as a part of the third lens group Gr3. The lens constitution of each embodiment is explained in detail below.

In the first embodiment (FIG. 1), each lens group is structured as follows. The first lens group Gr1 consists of a single lens of a negative meniscus lens in which its image side surface is configured with an aspheric surface and its image side surface is shaped into concave. The second lens group Gr2 is structured with, sequentially from the object side, a negative meniscus lens in which its both surfaces are configured with respective aspheric surfaces and its image side surface is shaped into concave, and a positive meniscus lens in which its object side surface is shaped into convex. The third lens group Gr3 is structured with, sequentially from the object side, an aperture diaphragm SA, a biconvex positive lens (the third-first lens G31) in which its both surfaces are configured with respective aspheric surfaces, a biconcave negative lens (the third-second lens G32) in which its both surfaces are configured with respective aspheric surfaces, a light amount adjusting device St, and a positive meniscus lens (the third-third lens G33) in which its both surfaces are configured with respective aspheric surfaces and its image side surface is shaped into convex. The fourth lens group Gr4 consists of a single lens of a positive meniscus lens in which its both surfaces are configured with respective aspheric surfaces and its image side surface is shaped into convex.

In the second embodiment (FIG. 2), each lens group is structured as follows. The first lens group Gr1 consists of a single lens of a negative meniscus lens in which its image side surface is configured with an aspheric surface and its image side surface is shaped into concave. The second lens group Gr2 is structured with, sequentially from the object side, a negative meniscus lens in which its both surfaces are configured with respective aspheric surfaces and its image side surface is shaped into concave, and a positive meniscus lens in which its object side surface is shaped into convex. The third lens group Gr3 is structured with, sequentially from the object side, an aperture diaphragm SA, a biconvex positive lens (the third-first lens G31), a negative meniscus lens (the third-second lens G32) in which its both surfaces are configured with respective aspheric surfaces and its image side surface is shaped into concave, a light amount adjusting device St, and a positive meniscus lens (the third-third lens G33) in which its both surfaces are configured with respective aspheric surfaces and its object side surface is shaped into convex. The fourth lens group Gr4 consists of a single lens of a biconvex positive lens in which its both surfaces are configured with respective aspheric surfaces.

In the third embodiment (FIG. 3), each lens group is structured as follows. The first lens group Gr1 consists of a single lens of a negative meniscus lens in which its image side surface is configured with an aspheric surface and its image side surface is shaped into concave. The second lens group Gr2 is structured with, sequentially from the object side, a negative meniscus lens in which its both surfaces are configured with respective aspheric surfaces and its image side surface is shaped into concave, and a positive meniscus lens in which its object side surface is shaped into convex. The third lens group Gr3 is structured with, sequentially from the object side, an aperture diaphragm SA, a biconvex positive lens (the third-first lens G31) in which its both surfaces are configured with respective aspheric surfaces, a negative meniscus lens (the third-second lens G32) in which its image side surface is shaped into concave, a light amount adjusting device St, and a positive meniscus lens (the third-third lens G33) in which its both surfaces are configured with respective aspheric surfaces and its object side surface is shaped into convex. The fourth lens group Gr4 consists of a single lens of a positive meniscus lens in which its both surfaces are configured with respective aspheric surfaces and its image side surface is shaped into convex.

In the fourth embodiment (FIG. 4), each lens group is structured as follows. The first lens group Gr1 consists of a single lens of a negative meniscus lens in which its image side surface is configured with an aspheric surface and its image side surface is shaped into concave. The second lens group Gr2 is structured with, sequentially from the object side, a negative meniscus lens in which its both surfaces are configured with respective aspheric surfaces and its image side surface is shaped into concave, and a positive meniscus lens in which its object side surface is shaped into convex. The third lens group Gr3 is structured with, sequentially from the object side, an aperture diaphragm SA, a biconvex positive lens (the third-first lens G31), a negative meniscus lens (the third-second lens G32) in which its both surfaces are configured with respective aspheric surfaces and its image side surface is shaped into concave, a light amount adjusting device St, and a positive meniscus lens (the third-third lens G33) in which its both surfaces are configured with respective aspheric surfaces and its object side surface is shaped into convex.

In the fifth embodiment (FIG. 5), each lens group is structured as follows. The first lens group Gr1 consists of a single lens of a negative meniscus lens in which its image side surface is configured with an aspheric surface and its image side surface is shaped into concave. The second lens group Gr2 is structured with, sequentially from the object side, a negative meniscus lens in which its both surfaces are configured with respective aspheric surfaces and its image side surface is shaped into concave, and a positive meniscus lens in which its object side surface is shaped into convex. The third lens group Gr3 is structured with, sequentially from the object side, an aperture diaphragm SA, a positive meniscus lens (the third-first lens G31) in which its object side surface is shaped into convex, a negative meniscus lens (the third-second lens G32) in which its both surfaces are configured with respective aspheric surfaces and its image side surface is shaped into concave, a light amount adjusting device St, and a positive meniscus lens (the third-third lens G33) in which its both surfaces are configured with respective aspheric surfaces and its image side surface is shaped into convex.

In the sixth embodiment (FIG. 6), each lens group is structured as follows. The first lens group Gr1 consists of a single lens of a negative meniscus lens in which its image side surface is configured with an aspheric surface and its image side surface is shaped into concave. The second lens group Gr2 is structured with, sequentially from the object side, a negative meniscus lens in which its both surfaces are configured with respective aspheric surfaces and its image side surface is shaped into concave, and a positive meniscus lens in which its object side surface is shaped into convex. The third lens group Gr3 is structured with, sequentially from the object side, an aperture diaphragm SA, a biconvex positive meniscus lens (the third-first lens G31), a negative meniscus lens (the third-second lens G32) in which its both surfaces are configured with respective aspheric surfaces and its image side surface is shaped into concave, a light amount adjusting device St, and a positive meniscus lens (the third-third lens G33) in which its both surfaces are configured with respective aspheric surfaces and its object side surface is shaped into convex.

EXAMPLE

Hereafter, the structures of the zoom lens system to carry out the present invention are explained still more concretely with reference to construction data. Examples 1 to 6 given here are numerical examples corresponding to the above-mentioned first to sixth embodiments respectively, and lens constitution figures (FIGS. 1 to 6) representing the first to sixth embodiments show the lens constitutions and zoom movements of the corresponding Examples 1 to 6 respectively.

The construction data of each example show, in the order from the left-hand side column, face number, radius of curvature r (mm), axial face-to-face spacing d (mm), refractive index nd for d line, Abbe number vd for d line, and effective radius (mm). The surface marked with * is an aspheric surface and is defined by the following formula (AS) representing the surface shape of an aspheric surface. Here, in the aspheric surface data of each example, the coefficient of a term which does not have a notation is 0, and with regard to all the data, $E-n=\times 10^{-n}$.

$$X(H)=(C0 \cdot H^2)/\{1+\sqrt{(1-\epsilon \cdot C0^2 \cdot H^2)}\}+\Sigma(Aj \cdot H^j) \qquad (AS)$$

Here, in the formula (AS), $X(H)$ represents an amount of displacement in the optical axis AX direction at the location of a height of H (on the basis of the apex of a surface), H represents a height in a direction vertical to the optical axis AX, $C0$ represents a paraxial curvature ($=1/r$)

$\epsilon$ represents a secondary curved surface parameter, and $Aj$ represents a j-th order aspheric surface coefficient.

As various data, zoom ratio, focal length (mm), f number, view angle ($2\omega$, °), image height (mm), lens overall length (mm), BF (mm), and variable face-to-face spacing (mm) are shown, and as zoom lens group data, focal length (mm) of each lens group is shown. However, BF used here represents the distance from the image side surface of a cover glass (corresponding to parallel plane plate PT) to an image surface, and the position of an exit pupil is represented with a distance from the image surface. Further, the values corresponding to the conditional expressions of each example are shown in Table 1.

FIGS. 7 to 12 are aberration diagrams corresponding to Example 1 to Example 6, respectively, and at a wide angle end (W), an intermediate point, and a telephoto end (T), some aberrations (in the order from the left, spherical aberration, astigmatism and distortion aberrations) are indicated. In FIGS. 7 to 12, FNO is F number and Y' (mm) is the maximum image height (corresponding to a distance from the optical axis AX) on a light receiving surface SS of image pickup sensor SR. In the spherical-aberration diagrams, solid lines d represent spherical aberration (mm) for d line, and broken lines SC represent sine condition dissatisfying amount (mm). In the astigmatic diagram, broken lines DM represent astigmatism (mm) for d line on Meridional surface and solid lines DS represent astigmatism (mm) for d line on Sagetal surface.

Further, in the distortion aberration diagram, solid lines represent a distortion (%) for d line.

Example 1

Unit mm

Face data

| Face No. | r | d | nd | vd | Effective radius |
|---|---|---|---|---|---|
| Object | ∞ | ∞ | | | |
| 1 | 12.078 | 0.600 | 1.83500 | 42.98 | 4.68 |
| 2* | 5.119 | variable | | | 4.09 |
| 3* | 6.303 | 0.700 | 1.68863 | 52.90 | 2.76 |
| 4* | 2.576 | 0.066 | | | 2.16 |
| 5 | 2.885 | 1.152 | 1.90366 | 31.32 | 2.18 |
| 6 | 3.704 | variable | | | 1.89 |
| 7 (SA) | ∞ | 0.000 | | | 0.92 |
| 8* | 1.727 | 1.094 | 1.66547 | 55.20 | 0.96 |
| 9* | −28.863 | 0.576 | | | 1.1 |
| 10* | −193.808 | 0.600 | 2.00170 | 20.60 | 0.92 |
| 11* | 3.356 | 1.727 | | | 1.06 |
| 12* | −41.208 | 1.321 | 1.80486 | 24.74 | 2.49 |
| 13* | −10.951 | variable | | | 2.75 |
| 14* | −25.763 | 0.700 | 1.63550 | 23.89 | 2.79 |
| 15* | −11.132 | 0.200 | | | 3.19 |
| 16 | ∞ | 0.500 | 1.51680 | 64.20 | 5 |
| 17 | ∞ | BF | | | 5 |
| Image | ∞ | | | | |

Aspheric face data

Second face $\epsilon = 0.7704$,
A4 = −0.14180629E−02, A6 = −0.88398882E−04,
A8 = 0.19528470E−05
Third face $\epsilon = 1.0000$,
A4 = −0.33068375E−01, A6 = 0.39398821E−02,
A8 = −0.18737833E−03,
A10 = 0.27058285E−05
Fourth face $\epsilon = 1.0000$,
A4 = −0.39039586E−01, A6 = 0.73753286E−02,
A8 = −0.99058924E−03, A10 = 0.81201667E−04
8th face $\epsilon = 1.0000$,
A4 = −0.20382164E−02, A6 = 0.85187093E−03,
A8 = −0.16190564E−02, A10 = −0.69350102E−03,
A12 = 0.54582807E−04, A14 = −0.17061284E−07
9th face $\epsilon = 1.0000$,
A4 = 0.19353064E−01, A6 = −0.57162030E−02,
A8 = −0.88715230E−02, A10 = 0.50202622E−03,
A12 = −0.13585211E−11, A14 = −0.68501054E−13
10th face $\epsilon = 1.0000$,
A4 = −0.15764910E−01, A6 = −0.55730213E−01,
A8 = 0.84228132E−02, A10 = −0.33655032E−01
11th face $\epsilon = 1.0000$,
A4 = 0.26179294E−01, A6 = −0.23416204E−01,
A8 = −0.12747407E−01, A10 = 0.97002005E−02
12th face $\epsilon = 1.0000$,
A4 = −0.23684219E−02, A6 = 0.19953935E−02,
A8 = −0.26514878E−03, A10 = 0.79490032E−05

-continued

Unit mm

13th face $\epsilon = 1.0000$,
A4 = −0.96175045E−02, A6 = 0.67168016E−03,
A8 = −0.33624500E−04, A10 = 0.52791264E−05,
A12 = −0.81242087E−06
14th face $\epsilon = 1.0000$,
A4 = 0.21590674E−01, A6 = −0.55448216E−02,
A8 = 0.23574508E−03, A10 = 0.19682741E−05,
A12 = 0.99803106E−09, A14 = −0.30974020E−10
15th face $\epsilon = 1.0000$,
A4 = 0.36689323E−01, A6 = −0.70023197E−02,
A8 = 0.46883628E−03, A10 = −0.19551431E−04,
A12 = 0.10730365E−05, A14 = −0.34566514E−07

Various data
Zoom ratio 2.749

| | (W) Wide angle | (M) Intermediate | (T) Telephoto |
|---|---|---|---|
| Focal length | 4.10 | 7.17 | 11.27 |
| F number | 3.80 | 5.13 | 6.63 |
| View angle (2ω) | 81.89 | 52.31 | 33.86 |
| Image height | 3.6 | 3.6 | 3.6 |
| Lens overall length | 15.9 | 15.9 | 15.9 |
| BF | 0.498 | 0.498 | 0.498 |
| D2 | 2.995 | 3.027 | 0.989 |
| D6 | 2.872 | 0.697 | 0.300 |
| d13 | 0.300 | 2.444 | 4.878 |
| Exit pupil | −7.429 | −10.96 | −15.848 |

Zoom lens group data

| Lens group | Start face | Focal length |
|---|---|---|
| 1 | 1 | −11.076 |
| 2 | 3 | −17.791 |
| 3 | 7 | 3.819 |
| 4 | 14 | 30.279 |

Example 2

Unit mm

Face data

| Face No. | r | d | nd | vd | Effective radius |
|---|---|---|---|---|---|
| Object | ∞ | ∞ | | | |
| 1 | 10.000 | 0.686 | 1.83500 | 42.98 | 4.79 |
| 2* | 5.173 | variable | | | 4.07 |
| 3* | 9.129 | 0.700 | 1.68863 | 52.90 | 2.55 |
| 4* | 2.426 | 0.332 | | | 2.05 |
| 5 | 3.411 | 1.087 | 1.90366 | 31.32 | 2.06 |
| 6 | 5.753 | variable | | | 1.85 |
| 7 (SA) | ∞ | 0.000 | | | 1 |
| 8 | 2.032 | 1.317 | 1.58913 | 61.25 | 1.03 |
| 9 | −10.399 | 0.520 | | | 1.1 |
| 10* | 34.447 | 0.773 | 1.82114 | 24.06 | 1.07 |
| 11* | 3.356 | 2.462 | | | 1.23 |
| 12* | 8.000 | 0.876 | 1.63550 | 23.89 | 2.59 |
| 13* | 12.260 | variable | | | 2.86 |
| 14* | 16.604 | 0.992 | 1.60280 | 28.30 | 3.19 |

-continued

Unit mm

| | | | | | |
|---|---|---|---|---|---|
| 15* | −28.191 | 0.332 | | | 3.38 |
| 16 | ∞ | 0.500 | 1.51680 | 64.20 | 5 |
| 17 | ∞ | BF | | | 5 |
| Image | ∞ | | | | |

Aspheric surface data

Second face

ε = 1.0000,
A4 = −0.29370077E−03, A6 = −0.80343960E−04,
A8 = −0.41136877E−06, A10 = 0.12800373E−07

Third face

ε = 1.0000,
A4 = −0.22594324E−01, A6 = 0.24739503E−02,
A8 = −0.12669775E−03, A10 = 0.40498067E−05

Fourth face

ε = 1.0000,
A4 = −0.30896463E−01, A6 = 0.43122999E−02,
A8 = −0.55251995E−03, A10 = 0.27903852E−04

10th face

ε = 1.0000,
A4 = −0.58721609E−01, A6 = −0.43188889E−02,
A8 = −0.59172132E−02, A10 = −0.26875350E−04

11th face

ε = 1.0000,
A4 = −0.37652992E−01, A6 = 0.66970583E−02,
A8 = −0.22896994E−02, A10 = 0.10496439E−02

12th face

ε = 1.0000,
A4 = −0.97707578E−02, A6 = 0.14926882E−02,
A8 = −0.10538676E−03, A10 = −0.69045045E−05

13th face

ε = 1.0000,
A4 = −0.10616825E−01, A6 = 0.10311490E−02,
A8 = 0.20933828E−04, A10 = −0.17160857E−04,
A12 = 0.66656467E−06

14th face

ε = 1.0000,
A4 = 0.62161473E−02, A6 = −0.19063390E−02,
A8 = 0.20161095E−03, A10 = −0.18340886E−04,
A12 = 0.88854823E−06, A14 = −0.67794090E−08

15th face

ε = 1.0000,
A4 = 0.18117772E−01, A6 = −0.38092500E−02,
A8 = 0.39999905E−03, A10 = −0.28170677E−04,
A12 = 0.92269015E−06, A14 = −0.15305826E−08

Various data
Zoom ratio 2.749

| | (W)<br>Wide angle | (M)<br>Intermediate | (T)<br>Telephoto |
|---|---|---|---|
| Focal length | 4.10 | 7.17 | 11.27 |
| F number | 3.80 | 5.23 | 6.78 |
| View angle (2ω) | 84.5 | 52.27 | 34.07 |
| Image height | 3.6 | 3.6 | 3.6 |
| Lens overall length | 17.8 | 17.8 | 17.8 |

-continued

Unit mm

| | | | |
|---|---|---|---|
| BF | 0.501 | 0.501 | 0.501 |
| d2 | 3.493 | 3.128 | 0.997 |
| d6 | 2.931 | 0.848 | 0.300 |
| d13 | 0.300 | 2.748 | 5.426 |
| Exit pupil | −8.608 | −14.607 | −25.764 |

Zoom lens group data

| Lens group | Start face | Focal length |
|---|---|---|
| 1 | 1 | −13.722 |
| 2 | 3 | −12.306 |
| 3 | 7 | 4.139 |
| 4 | 14 | 17.480 |

Example 3

Unit mm

Face data

| Face No. | r | d | nd | vd | Effective radius |
|---|---|---|---|---|---|
| Object | ∞ | ∞ | | | |
| 1 | 11.022 | 0.600 | 1.77250 | 49.36 | 4.76 |
| 2* | 5.166 | Variable | | | 4.16 |
| 3* | 5.362 | 0.577 | 1.85135 | 40.10 | 2.64 |
| 4* | 2.885 | 0.100 | | | 2.29 |
| 5 | 4.286 | 1.022 | 1.94595 | 17.98 | 2.26 |
| 6 | 5.156 | Variable | | | 1.99 |
| 7 (SA) | ∞ | 0.000 | | | 1.03 |
| 8* | 2.305 | 1.729 | 1.66547 | 55.20 | 1.04 |
| 9* | −14.982 | 0.532 | | | 1.1 |
| 10 | 21.491 | 0.400 | 1.92286 | 20.88 | 1.21 |
| 11 | 4.186 | 2.783 | | | 1.25 |
| 12* | 11.888 | 1.114 | 1.80486 | 24.74 | 2.56 |
| 13* | 65.209 | Variable | | | 2.86 |
| 14* | 11.611 | 0.700 | 1.60280 | 28.30 | 2.91 |
| 15* | 11.507 | 0.323 | | | 3.29 |
| 16 | ∞ | 0.500 | 1.51680 | 64.20 | 5 |
| 17 | ∞ | BF | | | 5 |
| Image | ∞ | | | | |

Aspheric surface data

Second face

ε = 1.0133,
A4 = −0.12798913E−02, A6 = −0.75209648E−04,
A8 = 0.24254458E−06

Third face

ε = 1.0000,
A4 = −0.34356379E−01, A6 = 0.22880738E−02,
A8 = 0.12895678E−03, A10 = −0.13520398E−04

Fourth face

ε = 1.0000,
A4 = −0.43903874E−01, A6 = 0.54327089E−02,
A8 = −0.46233961E−03, A10 = 0.29832492E−04

8th face

ε = 1.0000,
A4 = 0.16219018E−02, A6 = 0.88195398E−03,
A8 = 0.11595472E−02, A10 = −0.34777101E−03,
A12 = 0.54633427E−04, A14 = −0.10540766E−08

9th face

ε = 1.0000,
A4 = 0.25566404E−01, A6 = 0.10175963E−01,

-continued

Unit mm

A8 = −0.27771762E−02, A10 = 0.32488816E−02,
A12 = 0.25040585E−12, A14 = −0.42149118E−14

12th face $\epsilon$ = 1.0000,
A4 = −0.69027480E−02, A6 = 0.32563240E−03,
A8 = 0.15715609E−04, A10 = −0.12079017E−04,
A12 = −0.21238401E−07

13th face $\epsilon$ = 1.0000,
A4 = −0.90047801E−02, A6 = 0.45663126E−03,
A8 = −0.39476184E−04, A10 = −0.83190524E−06,
A12 = −0.24490316E−06

14th face $\epsilon$ = 1.0000, A4 = 0.19032711E−02, A6 = −0.23941253E−02,
A8 = 0.11284297E−03

15th face $\epsilon$ = 1.0000,
A4 = 0.11502774E−01, A6 = −0.30580723E−02,
A8 = 0.17547531E−03, A10 = −0.31676620E−05,
A12 = 0.43843534E−07, A14 = −0.16249613E−08

Various data
Zoom ratio 2.748

|  | (W) Wide angle | (M) Intermediate | (T) Telephoto |
|---|---|---|---|
| Focal length | 4.25 | 7.43 | 11.68 |
| F number | 3.65 | 4.88 | 6.19 |
| View angle (2ω) | 78.33 | 50.77 | 33.02 |
| Image height | 3.6 | 3.6 | 3.6 |
| Lens overall length | 17.8 | 17.8 | 17.8 |
| BF | 0.5 | 0.5 | 0.5 |
| D2 | 3.541 | 3.208 | 1.003 |
| D6 | 3.079 | 0.872 | 0.300 |
| d13 | 0.300 | 2.840 | 5.617 |
| Exit pupil | −7.548 | −10.014 | −12.694 |

Zoom lens group data

| Lens group | Start face | Focal length |
|---|---|---|
| 1 | 1 | −13.175 |
| 2 | 3 | −12.958 |
| 3 | 7 | 4.322 |
| 4 | 14 | 1388.651 |

Example 4

Unit mm

Face data

| Face No. | r | d | nd | vd | Effective radius |
|---|---|---|---|---|---|
| Object | ∞ | ∞ | | | |
| 1 | 10.474 | 0.600 | 1.83500 | 42.98 | 4.77 |
| 2* | 5.383 | Variable | | | 4.15 |
| 3* | 9.920 | 0.700 | 1.68863 | 52.90 | 2.77 |
| 4* | 2.463 | 0.543 | | | 2.14 |
| 5 | 3.663 | 1.058 | 1.90366 | 31.32 | 2.17 |
| 6 | 6.037 | Variable | | | 1.97 |
| 7 (SA) | ∞ | 0.000 | | | 1.09 |
| 8 | 2.051 | 1.296 | 1.58913 | 61.25 | 1.13 |
| 9 | −11.153 | 0.497 | | | 1.1 |
| 10* | 19.223 | 0.600 | 1.82114 | 24.06 | 1.07 |
| 11* | 3.356 | 3.673 | | | 1.14 |
| 12* | 10.067 | 1.011 | 1.63550 | 23.89 | 2.8 |
| 13* | 17.593 | Variable | | | 3.15 |
| 14 | ∞ | 0.500 | 1.51680 | 64.20 | 5 |
| 15 | ∞ | BF | | | 5 |
| Image | ∞ | | | | |

Aspheric surface data

Second face $\epsilon$ = 1.0000,
A4 = −0.70426056E−03, A6 = −0.30370419E−04,
A8 = −0.47132945E−05, A10 = 0.15600053E−06

Third face $\epsilon$ = 1.0000,
A4 = −0.19613766E−01, A6 = 0.17819890E−02,
A8 = −0.37463960E−04, A10 = −0.62704124E−06

Fourth face $\epsilon$ = 1.0000,
A4 = −0.25713971E−01, A6 = 0.23763132E−02,
A8 = −0.12930227E−03, A10 = −0.85015617E−06

10th face $\epsilon$ = 1.0000,
A4 = −0.55180613E−01, A6 = −0.41424526E−02,
A8 = −0.18918343E−02, A10 = −0.77829178E−03

11th face $\epsilon$ = 1.0000,
A4 = −0.33285243E−01, A6 = 0.69990542E−02,
A8 = −0.71703704E−03, A10 = 0.74880062E−03

12th face $\epsilon$ = 1.0000,
A4 = −0.22428581E−02, A6 = −0.13244587E−02,
A8 = 0.27960189E−03, A10 = −0.26197977E−04

13th face $\epsilon$ = 1.0000,
A4 = −0.27167725E−02, A6 = −0.13090248E−02,
A8 = 0.26248529E−03, A10 = −0.25941349E−04,
A12 = 0.66608040E−06

Various data
Zoom ratio 2.749

|  | (W) Wide angle | (M) Intermediate | (T) Telephoto |
|---|---|---|---|
| Focal length | 4.10 | 7.17 | 11.27 |
| F number | 3.80 | 5.18 | 6.67 |
| View angle (2ω) | 85.15 | 56.38 | 37.31 |
| Image height | 3.6 | 3.6 | 3.6 |
| Lens overall length | 17.8 | 17.8 | 17.8 |
| BF | 0.5 | 0.5 | 0.5 |
| D2 | 3.101 | 2.991 | 1.009 |
| D6 | 3.424 | 1.021 | 0.300 |
| D13 | 0.322 | 2.810 | 5.514 |
| Exit pupil | −7.188 | −9.677 | −12.38 |

Zoom lens group data

| Lens group | Start face | Focal length |
|---|---|---|
| 1 | 1 | −14.013 |
| 2 | 3 | −10.888 |
| 3 | 7 | 4.367 |

Example 5

Unit mm

Face data

| Face No. | r | d | nd | vd | Effective radius |
|---|---|---|---|---|---|
| Object | ∞ | ∞ | | | |
| 1 | 10.812 | 0.600 | 1.83500 | 42.98 | 4.94 |
| 2* | 5.234 | Variable | | | 4.26 |
| 3* | 12.041 | 0.700 | 1.68863 | 52.90 | 2.67 |
| 4* | 2.443 | 0.443 | | | 2.08 |
| 5 | 3.392 | 1.108 | 1.90366 | 31.32 | 2.12 |
| 6 | 5.926 | Variable | | | 1.92 |
| 7 (SA) | ∞ | 0.000 | | | 1.09 |
| 8 | 1.908 | 1.168 | 1.58913 | 61.25 | 1.13 |
| 9 | 221.641 | 0.608 | | | 1.1 |
| 10* | 6.911 | 0.748 | 2.14320 | 17.80 | 1.05 |
| 11* | 3.356 | 3.238 | | | 1.13 |
| 12* | −24.056 | 1.063 | 1.63550 | 23.89 | 2.57 |
| 13* | −12.673 | Variable | | | 2.96 |
| 14 | ∞ | 0.500 | 1.51680 | 64.20 | 5 |
| 15 | ∞ | BF | | | 5 |
| Image | ∞ | | | | |

Aspheric surface data

Second face

ϵ = 1.0000,
A4 = −0.62536340E−03, A6 = −0.33695166E−04,
A8 = −0.34100536E−05, A10 = 0.68273258E−07

Third face

ϵ = 1.0000,
A4 = −0.16960420E−01, A6 = 0.17395425E−02,
A8 = −0.86374650E−04, A10 = 0.28568998E−05

Fourth face

ϵ = 1.0000,
A4 = −0.20781483E−01, A6 = 0.16388120E−02,
A8 = −0.36006151E−05, A10 = −0.15769827E−04

10th face

ϵ = 1.0000,
A4 = −0.37811882E−01, A6 = −0.13971980E−01,
A8 = 0.70186936E−03, A10 = −0.47278021E−02

11th face

ϵ = 1.0000,
A4 = −0.19864193E−01, A6 = −0.40114258E−02,
A8 = −0.23150668E−02, A10 = 0.19433645E−02

12th face

ϵ = 1.0000,
A4 = −0.50559468E−03, A6 = −0.97306772E−03,
A8 = 0.25475576E−03, A10 = −0.35438590E−04

13th face

ϵ = 1.0000,
A4 = −0.17545214E−02, A6 = −0.98584846E−03,
A8 = 0.21707893E−03, A10 = −0.26205990E−04,
A12 = 0.66608040E−06

Various data
Zoom ratio 2.749

| | (W) Wide angle | (M) Intermediate | (T) Telephoto |
|---|---|---|---|
| Focal length | 4.10 | 7.17 | 11.27 |
| F number | 3.80 | 5.19 | 6.67 |
| View angle (2ω) | 84.29 | 56.33 | 37.08 |
| Image height | 3.6 | 3.6 | 3.6 |
| Lens overall length | 17.5 | 17.5 | 17.5 |
| BF | 0.5 | 0.5 | 0.5 |
| D2 | 3.491 | 3.119 | 1.012 |
| D6 | 3.038 | 0.884 | 0.300 |
| D13 | 0.300 | 2.827 | 5.517 |
| Exit pupil | −7.186 | −9.687 | −12.379 |

Zoom lens group data

| Lens group | Start face | Focal length |
|---|---|---|
| 1 | 1 | −12.777 |
| 2 | 3 | −11.138 |
| 3 | 7 | 4.263 |

Example 6

Unit mm

Face data

| Face No. | r | d | nd | vd | Effective radius |
|---|---|---|---|---|---|
| Object | ∞ | ∞ | | | |
| 1 | 10.041 | 0.600 | 1.83500 | 42.98 | 4.9 |
| 2* | 5.365 | Variable | | | 4.3 |
| 3* | 11.834 | 0.700 | 1.77250 | 49.62 | 2.77 |
| 4* | 2.473 | 0.402 | | | 2.14 |
| 5 | 3.510 | 1.127 | 1.90366 | 31.32 | 2.18 |
| 6 | 7.014 | Variable | | | 2 |
| 7 (SA) | ∞ | 0.000 | | | 1.08 |
| 8 | 1.920 | 1.366 | 1.56907 | 71.31 | 1.12 |
| 9 | −23.930 | 0.533 | | | 1.1 |
| 10* | 11.805 | 0.600 | 1.82114 | 24.06 | 1.05 |
| 11* | 3.356 | 3.430 | | | 1.17 |
| 12* | 19.637 | 1.021 | 1.63550 | 23.89 | 2.71 |
| 13* | 137.394 | Variable | | | 3.07 |
| 14 | ∞ | 0.500 | 1.51680 | 64.20 | 5 |
| 15 | ∞ | BF | | | 5 |
| Image | ∞ | | | | |

Aspheric surface data

Second face

ϵ = 1.0000,
A4 = −0.73588752E−03, A6 = −0.25002506E−04,
A8 = −0.41693939E−05, A10 = 0.10875976E−06

Third face

ϵ = 1.0000,
A4 = −0.17776730E−01, A6 = 0.19761935E−02,
A8 = −0.11718168E−03, A10 = 0.44417424E−05

Fourth face

ϵ = 1.0000,
A4 = −0.22646699E−01, A6 = 0.21910669E−02,
A8 = −0.10501010E−03, A10 = −0.11144355E−04

10th face

ϵ = 1.0000,
A4 = −0.66731191E−01, A6 = −0.12158533E−01,
A8 = −0.80277240E−03, A10 = −0.38716198E−02

11th face

ϵ = 1.0000,
A4 = −0.42968482E−01, A6 = 0.27638593E−02,
A8 = −0.24598678E−03, A10 = 0.10190206E−02

-continued

Unit mm

12th face

ε = 1.0000,
A4 = −0.16815305E−02, A6 = −0.12367925E−02,
A8 = 0.27107525E−03, A10 = −0.28877120E−04

13th face

ε = 1.0000,
A4 = −0.24092228E−02, A6 = −0.11680116E−02,
A8 = 0.23833357E−03, A10 = −0.25420608E−04,
A12 = 0.66608040E−06

Various data
Zoom ratio 2.749

|  | (W) Wide angle | (M) Intermediate | (T) Telephoto |
|---|---|---|---|
| Focal length | 4.10 | 7.17 | 11.27 |
| F number | 3.80 | 5.16 | 6.64 |
| View angle (2ω) | 84.86 | 56.33 | 37.24 |
| Image height | 3.6 | 3.6 | 3.6 |
| Lens overall length | 17.6 | 17.6 | 17.6 |
| BF | 0.5 | 0.5 | 0.5 |
| D2 | 3.206 | 2.986 | 1.005 |
| D6 | 3.318 | 1.024 | 0.300 |
| D13 | 0.300 | 2.814 | 5.518 |
| Exit pupil | −7.196 | −9.677 | −12.383 |

Zoom lens group data

| Lens group | Start face | Focal length |
|---|---|---|
| 1 | 1 | −14.65 |
| 2 | 3 | −10.143 |
| 3 | 7 | 4.304 |

TABLE 1

| Conditional Expression | Example 1 | Example 2 | Example 3 | Example 4 | Example 5 | Example 6 |
|---|---|---|---|---|---|---|
| (1) | 0.452 | 0.595 | 0.644 | 0.841 | 0.760 | 0.797 |
| (2) | 0.931 | 1.010 | 1.017 | 1.065 | 1.040 | 1.050 |
| (3) | 4.760 | 8.104 | 4.141 | 8.058 | 9.540 | 8.348 |
| (4) | −47.291 | −70.268 | −28.638 | −40.86 | −72.423 | −48.897 |
| (5) | 1.035 | 0.822 | 0.674 | 0.703 | 0.346 | 0.557 |
| (6) | −2.701 | −3.347 | −3.100 | −3.418 | −3.117 | −3.573 |
| (7) | 0.623 | 1.115 | 1.017 | 1.287 | 1.147 | 1.444 |

(1): L3/f3,
(2): f3/fw,
(3): f33/f3,
(4): f33/Dev33r
(5): (CR1 − CR2)/(CR1 + CR2),
(6): f1/fw,
(7): f1/f2

What is claimed is:

1. A zoom lens system comprising, in order from an object side:
   a first lens group having a negative optical power,
   a second lens group having a negative optical power, and,
   a third lens group having a positive optical power,
   wherein the position of the first lens group is fixed during zooming, and the third lens group comprises three single lenses including, in order from the object side, a third-first lens being a single lens having a positive optical power, a third-second lens being a single lens having a negative optical power and a third-third lens being a single lens having a positive optical power, and
   wherein the following conditional expression (1) is satisfied:

$$0.35 < L3/f3 < 1.5 \quad (1)$$

where L3 represents the axial air gap distance between the third-second lens and the third-third lens and f3 represents the focal length of the third lens group.

2. The zoom lens system described in claim 1, wherein the following conditional expression (2) is satisfied:

$$0.5 < f3/fw < 1.5 \quad (2)$$

where f3 represents the focal length of the third lens group, and fw represents the focal length of the entire system of the zoom lens system at a wide angle end position.

3. The zoom lens system described in claim 1, wherein the third-third lens includes at least one aspheric surface.

4. The zoom lens system described in claim 1, wherein the following conditional expression (3) is satisfied:

$$3 < f33/f3 < 15 \quad (3)$$

where f33 represents the focal length of the third-third lens, and f3 represents the focal length of the third lens group.

5. The zoom lens system described in claim 1, wherein the third-third lens has an aspheric surface on its image side surface and the following conditional expression (4) is satisfied:

$$-80 < f33/Dev33r < -20 \quad (4)$$

where f33 represents the focal length of the third-third lens, and Dev33r represents the difference in height in the optical axis direction at the maximum effective radius of the third-third lens between a reference spherical shape $X_o$ and a spherical shape X (Dev33r=X−$X_o$).

6. The zoom lens system described in claim 1, wherein the following conditional expression (5) is satisfied:

$$0.2 < (CR1-CR2)/(CR1+CR2) < 1.8 \quad (5)$$

where CR1 represents the radius of curvature at the object side of the third-second lens, and CR2 represents the radius of curvature at the image side of the third-second lens.

7. The zoom lens system described in claim 1, wherein the following conditional expression (6) is satisfied:

$$-3.7 < f1/fw < -2 \quad (6)$$

where f1 represents the focal length of the first lens group, and fw represents the focal length of the entire system of the zoom lens system at a wide angle end position.

8. The zoom lens system described in claim 1, wherein the following conditional expression (7) is satisfied:

$$0.5 < f1/f2 < 1.5 \quad (7)$$

where f1 represents the focal length of the first lens group, and f2 represents the focal length of the second lens group.

9. The zoom lens system described in claim 2, wherein the third-second lens includes at least one aspheric surface.

10. The zoom lens system described in claim 2, wherein the following conditional expression (3) is satisfied:

$$3 < f33/f3 < 15 \quad (3)$$

where f33 represents the focal length of the third-third lens, and f3 represents the focal length of the third lens group.

11. The zoom lens system described in claim 2, wherein the third-third lens has an aspheric surface on its image side surface and the following conditional expression (4) is satisfied:

$$-80 < f33/Dev33r < -20 \quad (4)$$

where f33 represents the focal length of the third-third lens, and Dev33$r$ represents the difference in height in the optical axis direction at the maximum effective radius of the third-third lens between a reference spherical shape $X_o$ and a spherical shape X(Dev33$r$=X−$X_o$).

12. The zoom lens system described in claim 2, wherein the following conditional expression (5) is satisfied:

$$0.2 < (CR1-CR2)/(CR1+CR2) < 1.8 \quad (5)$$

where CR1 represents the radius of curvature at the object side of the third-second lens, and CR2 represents the radius of curvature at the image side of the third-second lens.

13. An image pickup apparatus, comprising:
a zoom lens system, and
an image pickup element,
wherein the zoom lens system comprises, in order from an object side:
a first lens group having a negative optical power,
a second lens group having a negative optical power, and,
a third lens group having a positive optical power,
wherein the position of the first lens group is fixed during zooming, and the third lens group comprises three single lenses including, in order from the object side, a third-first lens being a single lens having a positive optical power, a third-second lens being a single lens having a negative optical power and a third-third lens being a single lens having a positive optical power, and
wherein the following conditional expression (1) is satisfied:

$$0.35 < L3/f3 < 1.5 \quad (1)$$

where L3 represents the axial air gap distance between the third-second lens and the third-third lens and f3 represents the focal length of the third lens group.

14. The image pickup apparatus described in claim 13, further comprising:
a light amount adjusting device in the third lens group.

15. The image pickup apparatus described in claim 14, wherein the light amount adjusting device is arranged between the third-second lens and the third-third lens.

16. The image pickup apparatus described in claim 13, wherein the following conditional expression (2) is satisfied:

$$0.5 < f3/fw < 1.5 \quad (2)$$

where f3 represents the focal length of the third lens group and fw represents the focal length of the entire system of the zoom lens system at a wide angle end position.

17. The image pickup apparatus described in claim 13, wherein the following conditional expression (3) is satisfied:

$$3 < f33/f3 < 15 \quad (3)$$

where f33 represents the focal length of the third-third lens, and f3 represents the focal length of the third lens group.

18. The image pickup apparatus described in claim 13, wherein the third-third lens has an aspheric surface on its image side surface and the following conditional expression (4) is satisfied:

$$-80 < f33/Dev33r < -20 \quad (4)$$

where f33 represents the focal length of the third-third lens, and Dev33$r$ represents the difference in height in the optical axis direction at the maximum effective radius of the third-third lens between a reference spherical shape $X_o$ and a spherical shape X(Dev33$r$=X−$X_o$).

19. The image pickup apparatus described in claim 13, wherein the following conditional expression (5) is satisfied:

$$0.2 < (CR1-CR2)/(CR1+CR2) < 1.8 \quad (5)$$

where CR1 represents the radius of curvature at the object side of the third-second lens, and CR2 represents the radius of curvature at the image side of the third-second lens.

20. A digital device, comprising:
a zoom lens system;
an image pickup element;
a signal processing section to conduct a predetermined processing for image signals produced by the image pickup element; and
a controller to control zooming of the zoom lens system and image pickup;
wherein the zoom lens system comprises, in order from an object side:
a first lens group having a negative optical power,
a second lens group having a negative optical power, and,
a third lens group having a positive optical power,
wherein the position of the first lens group is fixed during zooming, and the third lens group comprises three single lenses including, in order from the object side, a third-first lens being a single lens having a positive optical power, a third-second lens being a single lens having a negative optical power and a third-third lens being a single lens having a positive optical power, and
wherein the following conditional expression (1) is satisfied:

$$0.35 < L3/f3 < 1.5 \quad (1)$$

where L3 represents the axial air gap distance between the third-second lens and the third-third lens and f3 is the focal length of the third lens group.

* * * * *